United States Patent
Kako

[11] Patent Number: 5,957,095
[45] Date of Patent: Sep. 28, 1999

[54] VALVE TIMING CONTROLLING DEVICE OF INTERNAL COMBUSTION ENGINE

[75] Inventor: Hajime Kako, Tokyo, Japan

[73] Assignee: Mitsubishi Denki Kabushiki Kaisha, Tokyo, Japan

[21] Appl. No.: 09/064,872

[22] Filed: Apr. 23, 1998

[30] Foreign Application Priority Data

Oct. 24, 1997 [JP] Japan .................................. 9-292440

[51] Int. Cl.$^6$ .............................. F02D 13/02; F01L 1/34
[52] U.S. Cl. ..................................... 123/90.15; 123/90.17
[58] Field of Search ............................ 123/90.15, 90.16, 123/90.17, 90.31

[56] References Cited

U.S. PATENT DOCUMENTS

| | | | |
|---|---|---|---|
| 5,363,817 | 11/1994 | Ikeda et al. | 123/90.15 |
| 5,522,352 | 6/1996 | Adachi et al. | 123/90.15 |
| 5,562,071 | 10/1996 | Urushihata et al. | 123/90.15 |
| 5,611,304 | 3/1997 | Shinojima | 123/90.15 |
| 5,628,286 | 5/1997 | Kato et al. | 123/90.15 |
| 5,680,834 | 10/1997 | Szpak et al. | 123/90.15 |

FOREIGN PATENT DOCUMENTS 6-159021  6/1994  Japan .
9-60508   3/1997  Japan .

*Primary Examiner*—Weilun Lo
*Attorney, Agent, or Firm*—Sughrue, Mion, Zinn, Macpeak & Seas, PLLC

[57] ABSTRACT

A valve timing controlling device of internal combustion engine having a means for controlling an actual valve timing which controls the actual valve timing so as to converge at a target valve timing, a means for controlling integration which corrects a controlled variable, the means for controlling actual valve timing, and means for terminating integration which terminates integration performed by the means for controlling integration when the actual valve timing is heading to the target valve timing, by which the actual valve timing can stably be converged at the target valve timing and a steady-state deviation between the actual valve timing and the target valve timing can be eliminated because the means for controlling integration performs integration when the steady-state deviation exists between the actual valve timing and the target valve timing, namely when the actual valve timing does not converge at the target valve timing.

9 Claims, 21 Drawing Sheets

DIRECTION OF ROTATION

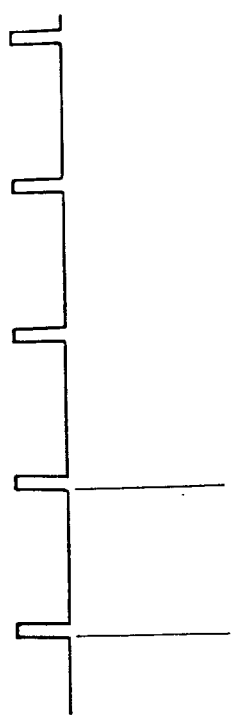
FIGURE 12(a) CRANK ANGLE SIGNAL
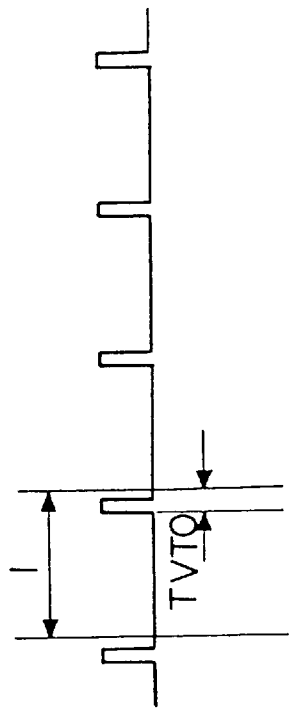
FIGURE 12(b) CAM ANGLE SIGNAL (MAXIMUM RETARD)
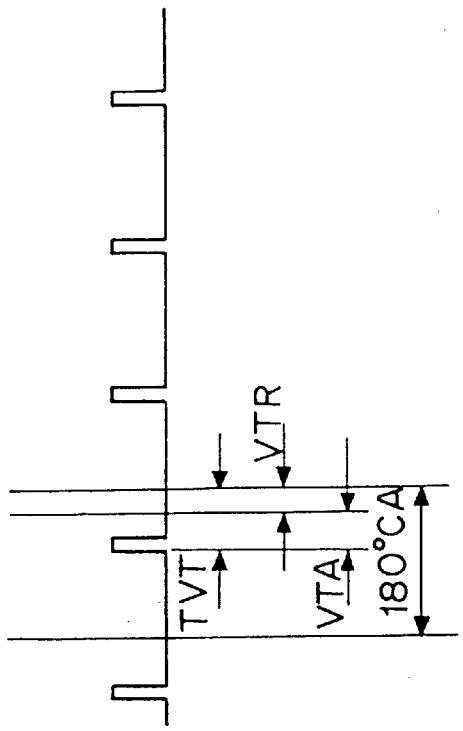
FIGURE 12(c) CAM ANGLE SIGNAL (AN ADVANCED STATE)

S,957,095

VALVE TIMING CONTROLLING DEVICE OF INTERNAL COMBUSTION ENGINE

BACKGROUND OF THE INVENTION

1. Field of the Invention

The present invention relates to a valve timing controlling device for adjusting a timing of opening and closing intake valves and exhaust valves depending on driving conditions of an internal combustion engine.

2. Discussion of Background

A mechanism of variably controlling intake valves, exhaust valves or the both of the valves depending on driving conditions is conventionally known, for example, the mechanism shown in Japanese Unexamined Patent Publication No. Hei 9-60508 (JP-A-9-60508). As for a method of controlling such a mechanism, it is disclosed for example in Japanese Unexamined Patent Publication No. Hei 6-159021 (JP-A-6-159021). Hereinbelow, the conventional valve timing controlling device of internal combustion engine is describe in reference of FIGS. 22 through 27, which concern the conventional device, and FIGS. 2 through 13, which are embodiments of the present invention.

FIG. 2 is a schematical view for showing a gasoline engine system having a mechanism of varying valve timing, wherein a portion around one cylinder, for example of four cylinders, is shown. In FIG. 2, numeral 1 designates an engine having a plurality of cylinders; numeral 2 designates a cylinder block for forming the plurality of cylinders of the engine 1; numeral 3 designates a cylinder head connected to the upper portion of the cylinder block 2; and numeral 4 designates a piston for reciprocating vertically in each cylinder of the cylinder block 2; numeral 5 designates a crank shaft connected to a lower end portion of the piston 4, which is rotated by the vertical movement of the piston 4.

Further, numeral 6 designates a crank angle sensor for detecting a revolution number NE of the engine 1 and detecting that the crank shaft 5 is in a predetermined base crank angle, which sensor is arranged in the vicinity of the crank shaft 5; and numeral 7 designates a signal rotor connected to the crank shaft 5. In the periphery of the signal rotor 7, a pair of teeth are formed interposing 180°. A crank angle signal in a pulse-like form is generated from the crank angle sensor 6 at each time when one of the teeth passes a front portion of the crank angle sensor 6.

Numeral 8 designates a combustion chamber for burning a mixed air, which is separated and formed by the inner wall of cylinder block 2, the inner wall of cylinder head 3 and the top portion of piston 4; numeral 9 designates a spark plug for firing a mixed air, which is provided in a top portion of the cylinder head 3 so as to protrude into the combustion chamber 8; numeral 10 designates a distributor which are connected to an exhaust camshaft 20 (described in the below) of the cylinder head 3; and numeral 11 designates an igniter for generating a high voltage. Each spark plug 9 is connected to the distributor 10 interposing a high-tension code (not shown), wherein the high voltage generated by the igniter 11 is distributed to the spark plugs 9 by the distributor 10 in synchronism with the rotation of crank shaft 5.

Numeral 12 designates a water temperature sensor disposed in the cylinder block 2 for detecting a temperature of cooling water flowing in a cooling water path. Numeral 13 designates an intake port provided in the cylinder head 3; numeral 14 designates an exhaust port provided in the cylinder head 3; numeral 15 designates an intake pipe connected to the intake port 13; and numeral 16 designates an exhaust pipe connected to the exhaust port 14; numeral 17 designates an intake valve provided in the intake port 13 of the cylinder head 3; and numeral 18 designates an exhaust valve provided in the exhaust port 14 of the cylinder head 3.

Numeral 19 designates an intake camshaft arranged above the intake valve 17 for opening and closing the intake valve 17; numeral 20 designates an exhaust camshaft arranged above the exhaust valve 18 for opening and closing the exhaust valve 18; numeral 21 designates an intake timing pulley provided at one end of the intake camshaft 19; numeral 22 designates an exhaust timing pulley provided in one end of the exhaust camshaft 20; and numeral 23 designates a timing belt for connecting the timing pulleys 21 and 22 to the crank shaft 5. Incidentally, the intake camshaft 19 and the exhaust camshaft 20 rotate at a half speed of that of the crank shaft 5.

Accordingly, when the engine 1 is operated, the respective camshafts 19 and 20 receive a rotational driving force from the crank shaft 5 through the timing belt 23 and the respective timing pulleys 21 and 22 to thereby open and close the intake valve 17 and the exhaust valve 18. These valves 17 and 18 are driven at a predetermined timing of opening and closing in synchronism with the rotation of the crank shaft 5 and the vertical movement of the piston 4, namely sequential four strokes of intake, compression, explosion with expansion, and exhaust in the engine 1.

Further, numeral 24 designates a cam angle sensor for detecting valve timing of the intake valve 17; and numeral 25 designates a signal rotor connected to the intake camshaft 19, in which four teeth are formed in the periphery thereof every 90°, and a cam angle signal like pulse is generated from the cam angle sensor 24 at every passing of one of the teeth in front of the cam angle sensor 24.

Numeral 26 designates a throttle valve opened and closed in association with an accelerator pedal (not shown) and provided in a half way of the intake port 15, wherein the amount of intake air is adjusted by opening and closing the throttle valve 26. Numeral 27 designates a throttle sensor for detecting an opening degree of the throttle valve TVO, which is connected to the throttle valve 26; numeral 28 designates an intake air flow sensor of thermal type for detecting the air flow rate (intake air quantity) QA inhaled into the engine 1, which is disposed at the upstream side of the throttle valve 26; numeral 29 designates a surge tank for restricting intake pulsation, which is formed at the downstream side of the throttle valve 26; and numeral 30 designates an injector provided in the vicinity of each intake port 13 of the cylinders for supplying fuel into the combustion chamber 8.

The injectors 30 are electromagnetic valves to be opened by an application of electricity and supplied with a pressurized fuel received from a fuel pump (not shown). Accordingly, when the engine 1 is operated, an air is introduced into the intake pipe 15 and the fuel is injected from the injector 30 to the intake port 13 simultaneously. As a result, a mixed air is produced in the intake port 13, and the mixed air is introduced into the combustion chamber 8 in association with the opening of the intake valve 17 in the intake stroke.

Numeral 40 designates a mechanism for varying valve timing (hereinbelow, referred to as VVT), which is connected to the intake camshaft 19 and driven by a working oil for changing the valve timing of the intake valve 17, wherein the working oil is lubricating oil of the engine 1, and VVT is connected to the intake camshaft 19. This VVT 40 is to change continuously the valve timing of the intake valve 17 by changing the relative angle between the intake timing pulley 21 and the intake camshaft 19. Numeral 80 designates an oil control valve (hereinbelow, referred to as OCV) for supplying the working oil to VVT 40 and adjusting the quantity of working oil.

Numeral 100 designates an electronical controlling unit (hereinbelow referred to as ECU) for driving the injector 30, the igniter 11 and OCV 80 based on signals mainly received from the intake air flow sensor 28, the throttle sensor 27, the water temperature sensor 12, the crank angle sensor 6 and the cam angle sensor 24 and for controlling an injection quantity of fuel, an ignition timing and a valve timing.

In the next, structure of system for varying valve timing composed of VVT 40 and OCV 80 is described in reference of FIGS. 3 through 9. FIG. 3 is a cross-sectional view of the intake cam shaft 19, in which VVT 40 is provided, including an explanation of structure of means for supplying the working oil for driving VVT 40.

In FIG. 3, numeral 40 designates VVT for adjusting the intake valve timing. Numeral 21 designates the intake timing pulley which rotates in synchronism with the crank shaft 5 by providing the timing belt 23, rotated by crank shaft 5. Numeral 19 designates the intake camshaft to which a changed phase of rotation from that of the intake timing pulley 21 is transmitted by interposing VVT 40 and connecting to VVT 40. Numeral 41 designates a bearing fixed to the cylinder head 3 for rotatably supporting the intake camshaft 19. Numeral 42 designates a first oil path connected to a retard hydraulic chamber 62 (described in the below) which retards the rotor 52 in the direction of retard, which first oil path formed in the intake camshaft 19 and the rotor 52 (described in the below). Numeral 43 designates a second oil path connected to an advance hydraulic chamber 63 (described in the below) which moves the rotor 52 (described in the below) in the direction of advance, which second oil path is formed in the intake camshaft 19 and the rotor 52.

Numeral 80 designates the OCV for controlling the quantity of working oil to be supplied to VVT 40. Numeral 90 designates an oil pan provided in the engine 1; numeral 91 designates an oil pump; and numeral 92 designates an oil filter, wherein the oil pan 90, the oil pump 91 and the oil filter 92 constitute a lubricating device for lubricating various portions of the engine 1. Further, the oil pan 90, the oil pump 91 and the oil filter 92 constitute together with the OCV 80 a device for supplying the working oil to VVT 40.

In this, numeral 81 designates a housing; numeral 82 designates a spool valve sliding in the housing 81; numeral 83 designates a linear solenoid for sliding the spool valve 82 depending on a control signal from ECU 100; and numeral 84 designates a spring for urging the spool valve 82 in the direction reverse to the driving direction of the linear solenoid 83. Numeral 85 designates a supply port connected to the oil pump 91 interposing the oil filter 92 and formed in the housing 81; numeral 86 designates an A port connected to the first oil path 42 and formed in the housing 81; numeral 87 designates a B port connected to the second oil path 43 and formed in the housing 81; and numerals 88a and 88b are outlets connected to the oil pan 90 and formed in the housing 81.

By an operation of the oil pump 91 in association with the rotation of crank shaft 5 of the engine 1, the working oil sucked up from the oil pan 90 is ejected from the oil pump 91. The ejected working oil passes through the oil filter 92 and is applied with pressure by the OCV 80 to be selectively sent to each oil path 42 or 43. The quantity of oil for oil paths 42 and 43 is changed by successive change of respective opening degree of the A port 86 and the B port 87 caused by sliding of the spool valve 82, wherein the opening degree is determined by a value of electric current supplied to the linear solenoid 83. The ECU 100 is to control the electric current to be supplied to the linear solenoid 83 based on various sensor signals from the crank angle sensor 6, the cam angle sensor 24 and so on.

Further, numeral 44 designates a housing rotatably provided in the intake camshaft 19. Numeral 45 designates a case to be fixed to the housing 44. Numeral 46 designates back springs of leaf spring type for pushing tip seals 49 (described in the below) to the rotor 52 (described in the below), which are provided between the tip seals 49 and the case 45. Numeral 47 designates a cover fixed to the case 45. Numeral 48 designates a bolt for fixing the case 45 and the cover 47 to the housing 44. Numeral 49 designates the tip seals for preventing movement of the working oil between the hydraulic chambers separated by the rotor 52 and the case 45, which is to the rotor 52 by the back spring 46. Numeral 50 designates a plate to be attached to the cover 47. Numeral 51 designates a screw for fixing the plate 50 to the cover 47.

Numeral 52 designates the rotor fixed to the intake camshaft 19 and rotatably provided with respect to the case 45. Numeral 53 designates a holder in a cylindrical shape having recessed portions to be engaged with plungers 54 (described in the below) which is provided in the rotor 52. Numeral 54 designates plungers like protrusions sliding in the housing 44 by resiliency of springs 55 (described in the below) and hydraulic pressure of oil introduced into the holder 53. Numeral 55 designates the springs for urging the plungers 54 in the direction of the rotor 52. Numeral 56 designates a plunger oil path for introducing the hydraulic pressure to be applied to the plunger 54 in order to oppose the force of urging the spring 55. Numeral 57 designates air apertures for constantly maintaining the side of the spring 55 in the plunger 54 in the atmospheric pressure.

Numeral 58 designates connection bolts for connecting and fixing the rotor 52 to the intake camshaft 19. Numeral 59 designates an axial bolt for connecting and fixing the rotor 52 to the intake camshaft 19 along with the rotational axis. The axial bolt 59 is rotatably provided with respect to the cover 47. Numeral 60 designates an air path for maintaining the inside of the plate 50 in the atmospheric pressure, which is formed in the axial bolt 59 and the intake camshaft 19.

FIG. 4 shows a state that a hydraulic pressure is applied to the plunger 54 through the plunger oil path 56, for explanation. As shown in the Figure, the plunger 54 is pushed to the side of housing 44 while compressing the spring 55 by the hydraulic pressure, whereby the engagement with the holder 53 is released to enable rotation of the rotor 52 with respect to the housing 44.

FIG. 5 is a cross-sectional view taken along a line X—X in FIG. 3 viewed from the arrow for explanation. FIG. 6 shows how a slide plate 71 is moved for explanation. FIG. 7 is a cross-sectional view taken along a line Y—Y in FIG. 3 viewed from the arrow direction for explanation. FIG. 8 is a cross-sectional view taken along a line Z—Z in FIG. 3 viewed from the arrow direction for explanation.

In these Figures, numeral 61 designates bolt holes to which the bolts 48 are screwed. Numerals 62 designate the retard hydraulic chambers in a shape of pillar including a part of radius for rotating a first vane 64 through a fourth vane 67 in the direction of retard, wherein the retard hydraulic chambers are surrounded by the rotor 52, the case 45, the cover 47, the housing 44 and respectively the first vane 64 through the fourth vane 67. Further, the retard hydraulic chambers 62 are connected to the first oil path 42 to receive the working oil therefrom.

Numerals 63 designate advance hydraulic chambers in a shape of pillar including a part of radius for rotating the first vane 64 through the fourth vane 67 in the direction of advance, wherein the advance hydraulic chambers 63 are surrounded by the rotor 52, the case 45, the cover 47, the housing 44 and the corresponding vane among the first vane 64 through the fourth vane 67. The advance hydraulic chambers 63 are connected to the second oil path 43 to receive the working oil therefrom. The rotor 52 is moved with respect to the housing 44 depending on the quantities of working oil to be supplied to the retard hydraulic chambers 62 and the advance hydraulic chambers 63, thereby the volumes of respective hydraulic chambers are changed.

Numeral 64 designates the first vane provided in the rotor 52 so as to protrude in the direction to the outer periphery, wherein the holder 53 is embedded in the housing side of the first vane 64; a connecting oil path 70 (described in the below) is formed in a recessed shape in the side of the cover 47 thereon; a track groove 72 (described in the below) is formed in the middle of the connecting oil path 70 to serve as the plunger oil path 56 penetrating from the track groove 72 through the holder 53 to the housing 44.

Numerals 65 through 67 designate the second vane through the fourth vane provided on the rotor 52 so as to protrude in the direction to the outer periphery. Tip seals 73 (described in the below) are provided in portions where the first vane 64 through the fourth vane 67 are in contact with the case 45. Numeral 68 designates a vane supporting member which is a central portion of the rotor 52. Numeral 69 designates shoes protruded from the case 45 in the direction to the inner diameter, which shoes 69 have bolt holes 61 in which the bolts 48 are inserted, and the tip seals 49 are provided in a portion where the shoes are in contact with the vane supporting member 68.

Numeral 70 designates the connecting oil path for connecting the retard hydraulic chamber 62 and the advance hydraulic chamber 63 positioned on both sides of the first vane 64. Numeral 71 designates a slide plate movable in the track groove 72 (described in the below) provided in the middle of the connecting oil path 70, wherein the connecting oil path 70 is blocked to avoid leaking of oil between the retard hydraulic chamber 62 and the advance hydraulic chamber 63. The slide plate 71 moves in the direction of the retard hydraulic chamber 63 when the oil pressure of the retard hydraulic chamber 62 is higher than that of the advance hydraulic chamber 63 as shown in FIG. 5, and moves in the direction of the retard hydraulic chamber 62 when the oil pressure of the advance hydraulic chamber 63 is higher than that of the retard hydraulic chamber 62 as shown in FIG. 6.

Numeral 72 designates the track groove provided in the middle of the connecting oil path 72, to which the plunger oil path 56 is connected. As shown in FIG. 5, when the slide plate 71 moves in the direction of the retard hydraulic chamber 63, the plunger oil path 56 is connected to the retard hydraulic chamber 62. As shown in FIG. 6, when the slide plate 71 moves in the direction of the retard hydraulic chamber 62, the plunger oil path 56 is connected to the advance hydraulic chamber 63. Numeral 73 designates the tip seals which are provided in each of the first vane 64 through the fourth vane 67 for sealing the clearances between each vane and the case 45 to prevent oil from leaking. Arrows in FIGS. 5, 7 and 8 designate a rotational direction of VVT 40 as a whole driven by the timing belt 23 and so on.

In the next, operations of VVT 40 and OCV 80 will be described. When the engine 1 is stopped, the rotor 52 is in the position of the maximum retard (namely, the position of the rotor 52 fully rotated in the direction of retard with respect to housing 44) as shown in FIG. 5, wherein the oil pressure supplied from the oil pump 91 to OCV 80 is low or in the atmospheric pressure, whereby the oil pressure does not influence the first oil path 41, the second oil 43 and the plunger oil path 56. In this case, as shown in FIG. 3, the plunger 54 is pressed to the holder 53 by the force of urging the spring 55 to engage the plunger 54 and the holder 53.

When the engine 1 is started, the oil pump 91 is operated to increase the oil pressure to be supplied to OCV 80 and the oil pressure is transmitted to the retard hydraulic chamber 62 through the A port 86. In this case, the slide plate 71 is moved in the direction to the advance hydraulic chamber 63; the retard hydraulic chamber 62 and the plunger oil path 56 are connected; the plunger 54 is pushed to move in the direction of the housing 44; and the plunger 54 and the rotor 52 are disengaged. However, since the oil pressure is transmitted into the retard hydraulic chamber 63, each vane 64 through 67 is in contact with and pressed to each shoe 69 in the direction of retard. Accordingly, even if the plunger 54 is disengaged, the housing 44 and the rotor 52 are pressed to each other by the oil pressure of the retard hydraulic chamber 62, whereby vibration and shock can be avoided.

When the B port 87 is opened to advance the rotor 52, the working oil is supplied to the advance hydraulic chamber 63 through the second oil path 43. The oil pressure is transmitted from the advance hydraulic chamber 63 to the connecting oil path 70; and the slide plate 71 is pressed by the oil pressure to move in the direction to the retard hydraulic chamber 62. The plunger oil path 56 is connected to the advance hydraulic chamber 63 through the connecting oil path 70 by this movement of the slide plate 71, whereby the oil pressure is transmitted from the advance hydraulic chamber 63 to the plunger oil path 56. As shown in FIG. 4, the plunger 54 is moved in the direction to the housing 44 against the force of urging the spring 55 by this oil pressure, whereby the engagement between the plunger 54 and the holder 53 is released. While disengaging the plunger 54 and the holder 53, the quantity of oil is controlled by opening and closing the A port 86 and the B port 87 in order to adjust the quantity of oil in the retard hydraulic chamber 62 and the quantity of oil in the advance hydraulic chamber 63. Thus, it is possible to advance and retard the rotation of the rotor 52 with respect to the rotation of the housing 44.

Hereinbelow, a representative operation of OCV 80 is described with reference to FIG. 9. FIG. 9a shows a case that a control current applied from ECU 100 is 0.1 A, which is lower than a standard value 0.5 A. In this case, the spool valve 82 is urged in the direction to the left end of housing 81 by the spring 84, whereby the supply port 85 and the A port 86 are connected and the B port 87 and the outlet 88b are connected. The retard hydraulic chamber 62 is supplied with the working oil, and simultaneously, the working oil is ejected from the advance hydraulic chamber 63, wherein the rotor 52 shown in FIG. 9a is rotated in the counter-clockwise direction with respect to the housing 44, and the phase of intake camshaft 19 is retarded with respect to the intake timing pulley to obtain a retard operation.

On the other hand, FIG. 9b shows an example that the control current from ECU 100 is the standard value of 0.5 A, wherein the force of linear solenoid 83 and the force of spring 84, which compete against with each other, are balanced so that both of the A port 86 and the B port 87 maintained in the closed position by the spool valve 82 to stop supplying and the ejecting the working oil in the retard hydraulic chamber 62 and the advance hydraulic chamber 63. In this case, when the working oil in the retard hydraulic chamber 62 and that in the advance hydraulic chamber 63 are not leaked, the rotor 52 is kept in the same position and the phase between the intake timing pulley 21 and the intake camshaft 19 is kept without any change.

FIG. 9c shows an Example that the control current from ECU 100 is 1.0 A, which is larger than the standard value 0.5 A, wherein the spool valve 82 is driven by the linear solenoid 83 in the direction to the right end of housing 81 to connect between the supply port 85 and the B port 87 and to connect the A port 86 and the outlet 88a. In this case, the working oil is supplied to the advance hydraulic chamber 63 through the second oil path 43, and simultaneously the working oil is ejected from the retard hydraulic chamber 62. By this, the rotor 52 shown in FIG. 9c is rotated in the clockwise direction with respect to the housing 44 and the phase of the intake camshaft 19 with respect to the intake timing pulley 21 is advanced to obtain an advancing control.

In FIGS. 9a, 9b and 9c, a degree of connection between the supply port 85 and the A port 86 (or the B port 87) and a degree of connection between the outlet 88b (or 88a) and the B port 87 (or the A port 86) are controlled by the position of spool valve 82. Although the position of spool valve 82 and the value of current from the linear solenoid 83 are in a proportional relationship. FIG. 10 is a diagram showing a relationship between the values of current of the linear solenoid 83 (hereinbelow refereed to as a linear solenoid current) and an actual rate of varying valve timing under a certain driving condition of the engine 1. In FIG. 10, the region of plus (+) of the actual rate of varying valve timing corresponds to the region that the intake camshaft is moved in the advanced direction. On the other hands, the region of minus (−) of the actual rate of varying valve timing corresponds to the region that the intake camshaft is moved in the retard direction.

In FIG. 10, references a, b and c respectively designate the current corresponding to positions of the spool valve 82 is FIGS. 9a, 9b and 9c. The linear solenoid current by which the actual valve timing is not varied as shown by the reference b is a single point in which the quantity of working oil leaked from the hydraulic chambers 62 and 63, the oil paths and the spool valve 82 and the quantity of working oil supplied from the oil pump 91 with pressure are balanced.

Further, the single point always varies because the characteristic is varied as shown in FIG. 11 by a variation of the supplying pressure of working oil because of the revolution number of engine and the temperature. Also this single point and situation of changes of characteristics are different in each product because of a lack of product uniformity such as the dimensions of spool valve 82. The linear solenoid current at the point, in which the actual valve timing is not changed, is referred to as a holding current and represented by a reference HLD. When the valve timing is advanced based on this holding current HLD, the linear solenoid current is increased, and when the valve timing is retarded, the linear solenoid current is decreased.

A method of detecting the valve timing will be explained with reference to FIGS. 12a through 12c. FIG. 12a is a timing chart of a crank angle signal; FIG. 12b is that of a cam angle signal in the fully retarded state; and FIG. 12c is that of a cam angle signal in an advanced state. ECU 100 counts a period of the crank angle signal T and a time of phase difference TVT between the cam angle signal and the crank angle signal; calculates the fully retarded valve timing VTR in accordance with formula 1 using a time of phase difference in the fully retarded state of the valve timing TVTO and the period of crank angle signal T; and memorizes the fully retarded valve timing VTR.

[Formula 1]

$$VTR = \frac{TVTO}{T} \times 180° \ CA$$

The actual valve timing VTA is calculated in accordance with Formula 2 using the time of phase difference TVT, the period of crank angle signal T and the fully retarded valve timing VTR.

[Formula 2]

$$VTA = \frac{TVT}{T} \times 180° \ CA - VTR$$

ECU 100 performs a feedback control of linear solenoid current based on a deviation between the actual valve timing VTA and a target valve timing VTT so that the actual valve timing VTA is converged on the target valve timing VTT.

FIG. 13 is a schematical view for explaining the internal structure of ECU 100. In FIG. 13, numeral 101 designates a microcomputer, which comprises a central processing unit (CPU) 102 for performing various operations and various determinations, a read only memory (ROM) 103 for memorizing a predetermined control program or the like in advance, a random access memory (RAM) 104 for temporarily memorizing a result of operations of CPU or the like, an A/D converter 105 for converting an analog voltage to a digital value, a counter 106 for counting a period of input signal or the like, a timer 107 counting a running time of output signal or the like, an output port 108 for outputting the output signal, and a common bus 109 for connecting the above-mentioned elements.

Numeral 110 designates a first input circuit, wherein a signal received from the cam angle sensor 24 is reformed by the first input circuit 110 and thereafter inputted into the microcomputer 101 as an interrupt request signal (INT). At every interrupt request, CPU 102 reads the value in the counter 106 and stores it in RAM 104. The signal from the crank angle sensor 6 is reformed by the first input circuit 110 and inputted into the microcomputer 101 as an interrupt request signal (INT). At every interrupt request, CPU 102 reads the value in the counter 106; stores it in RAM 104; calculates the period of crank angle signal T depending on a difference from the previous counter value stored at the time of receiving the signal previously from the crank angle sensor 6; calculates the revolution number of engine NE based on this period of crank angle signal T; and calculates the time of phase difference TVT based on the counter value memorized in RAM 104 when the signal from the cam angle sensor 24 is received.

Numeral 111 designates a second input circuit. Signals from the water temperature sensor 12, the throttle sensor 27 and the intake air flow sensor 28 are subjected to removal of noise components, an amplification and so on by the second input circuit 111; transmitted to the A/D converter 105; and converted into digital data of the temperature of cooling water, the opening degree of throttle valve and the quantity of intake air.

Numeral 112 designates a driving circuit for driving the injector 30; and numeral 113 designates a driving circuit for driving the igniter 11. CPU 102 calculates a time of driving the injector and the ignition timing based on the above-mentioned various input signals; and drives the injector 30 and the igniter 11 through the output port 108 and the driving circuit 112 and 113 based on the result of counting in the timer 107 to thereby control the quantity of fuel injection the ignition timing.

Numeral 114 designates a current controlling circuit for controlling the linear solenoid current in OCV 80. CPU 102 calculates the linear solenoid current CNT in OCV 80 based on the above-mentioned various signals, and outputs a duty signal corresponding to the linear solenoid current CNT in OCV 80 to the output port 108 based on the resultant time counted in the timer 107. The current control circuit 114 performs the valve timing control based on this duty signal so that the current passes through the linear solenoid 83 in OCV 80 becomes the linear solenoid current CNT.

Numeral 115 designates a power supply circuit; numeral 116 designates a battery; and numeral 117 designates a key switch through which the microcomputer 101 is supplied with a constant voltage from the power supply circuit 115 applied with the voltage of battery 116 and operated.

In the next, operations of CPU 102 will be described with reference to FIGS. 22 through 24. FIG. 22 is a diagram of operation timing in a controlling device without an integrating control means when the actual holding current HLD is in agreement with the standard value 0.5 A. FIG. 23 is a diagram of operation of timing in a controlling device without an integrating control means when the actual holding current HLD is deviated in the direction of larger current than the standard value of 0.5 A. FIG. 24 is a diagram of operation timing in a controlling device having an integrating control means when the actual holding current HLD is deviated in the direction of the larger current than the standard value of 0.5 A.

OCV 80 can adjust the amount of working oil to be supplied in a unit time, whereby the displacement angle of VVT 40 is determined in response to the integrated amount of the supplied working oil. Thus the actual valve timing can be converged on the target valve timing by a control of the controlling means performed in proportion to the deviation ER between the target valve timing VTT and the actual valve timing VTR based on the standard value 0.5 A, in case that the actual holding current HLD of OCV 80 is in agreement with the standard value 0.5 A, because VVT 40 includes an element of integration. The linear solenoid current CNT in OCV 80 is obtainable by the following formula 3.

[Formula 3]

$$CNT = KP \times ER + 0.5 \text{ A}$$

In Formula 3, reference ER is the deviation between the valve timing VTT and the actual valve timing VTA, which is obtainable by formula 4.

[Formula 4]

$$ER = VTT - VTA$$

In Formula 3, reference KP designates a gain corresponding to the proportional operation.

In FIG. 22, changes of the target valve timing VTT, of the actual valve timing VTA and of the linear solenoid current CNT are shown.

However, the actual holding current HLD in OCV 80 is not always in agreement with the standard value 0.5 A. For example, when the actual holding current HLD is deviated on the higher current side than the standard value 0.5 A, the actual valve timing VTA does not converge at the target valve timing VTT as a result of the control based on formula 3, wherein a steady-state deviation ER1 remains.

In other words, the controlling device controls the linear solenoid current CNT in OCV 80 so that the deviation ER between the target valve timing VTT and the actual valve timing VTA becomes 0. In the case of FIG. 23, since the deviation of ER1 remains, the linear solenoid current CNT as much as (KP×ER1+0.5) A is applied in order to eliminate the deviation. However, in FIG. 23, the actual holding current HLD is deviated on the higher current side than the standard value 0.5 A by (KP×ER1). Accordingly, the controlling unit tries to control so that the actual valve timing VTA converges at the target valve timing VTT by applying the larger current than the standard value 0.5 A by (KP×ER1) so as to eliminate the deviation ER1. However, OCV 80 is in a state shown in FIG. 9b, in which both of the A port 86 and the B port 87 are closed. Accordingly, the deviation ER1 is not eliminated and remains as the steady-state deviation. This steady-state deviation ER1 is represented by Formula 5.

[Formula 5]

$$ER1 = (HLD - 0.5 \text{ A})/KP$$

Therefore, in the conventional controlling unit, an integral control is adopted in addition to the proportional control of Formula 3 and a control shown in Formula 6 is performed to eliminate the above steady-state deviation.

[Formula 6]

$$CNT = KP \times ER + \Sigma KI + 0.5 \text{ A}$$

In Formula 6, a term ΣKI is a correction value to integration obtained by integrating differences of integrals based on the deviation ER between the target valve timing VTT and the actual valve timing VTA and is obtainable in accordance with Formula 7.

[Formula 7]

$$\Sigma KI = \Sigma KI(i-1) + KI \times ER$$

In Formula 7, ΣKI(i-1) is the correction value to integration before integrating at this time, wherein a term KI designates a gain corresponding to the integrating operation. In Formula 7, a term KI×ER corresponds to the difference of integrals, wherein this KI is set to be a very small value in order to avoid an unstable control, which is caused by a large variation of the correction value to integration ΣKI by a transient increment of the deviation ER at the time of a step response or the like. FIG. 24 is a diagram showing changes of the target valve timing VTT, the actual valve timing VTA and the linear solenoid current CNT in a state that there is no steady-state deviation between the target valve timing VTT and the actual valve timing VTA, namely, a state that the correction value to integration ΣKI satisfies formula 8 as a result of the integral control.

[Formula 8]

$$HLD \Sigma KI + 0.5 \text{ A}$$

In the next, the controlling operation based on Formula 6 will be explained with reference to FIG. 25. FIG. 25 is a flow chart of control program stored in ROM 103. These flow chart is processed at every predetermined time, for example 25 ms, in CPU 102 of ECU 100. In Step S1 of FIG. 25, signals of stating operation conditions of the engine such as the period of a crank angle signal T, the revolution number of engine NE, the time of phase reference TVT, the intake air quantity QA, the opening degree of throttle TVO, the temperature of cooling water THW and so on derived from the crank angle sensor 6, the cam angle sensor 24, the intake air flow sensor 28, the throttle sensor 27 and the water temperature sensor 12.

In Step S2, a displacement angle actual valve timing (VTA) of the intake cam shaft 19 with respect to the crank shaft 5 is calculated in accordance with Formula 2 using the period of crank angle signal T and the time of phase difference TVT. In Step S3, the target valve timing VTT is calculated based on the revolution number of engine NE, the intake air quantity QA, the opening degree of throttle TVO and the temperature of cooling water THW. In Step 4, the deviation ER between the target valve timing VTT and the actual valve timing VTA is obtained in accordance with Formula 4.

In Step 5, the correction value to integration ΣKI is obtained in accordance with Formula 7. In this case, ΣKI (i−1) in Formula 7 designates the prior ΣKI before 25 ms. The correction value to integration ΣKI is initialized to zero just after the electricity from the power source is applied to ECU 100. Thereafter, in Step S6, the linear solenoid current CNT in OCV 80 is obtained in accordance with Formula 6.

In step 7, a duty signal corresponding to the linear solenoid current CNT in OCV 80 is outputted to the output port 108 based on the result of counted time in the timer 107. This duty signal is inputted to the electric current controlling circuit 114 and controls the current flowing in the linear solenoid 83 in OCV 80 to be the linear solenoid current CNT. Resultantly, the actual valve timing VTA is controlled to be the target valve timing VTT.

In the conventional valve timing controlling device of internal combustion engine, the steady-state deviation between the target valve timing VTT and the actual valve timing VTA appeared when the correction value to integration ΣKI at the time just after applying an electric power to ECU 100 is initialized or the actual holding current HLD in OCV 80 is changed by changes of operating condition.

In order to eliminate such a steady-state deviation in a short time, it was necessary to set the gain KI corresponding to the integral operation to have a large value. However, when the gain KI corresponding the integral operation was large, the correction value to integration ΣKI varied largely because of the increment of the transient deviation ER generated at the time of step response or the like as shown in FIG. 26, whereby there are problems that the control became unstable; overshoots and hauntings of the actual valve timing VTA occurred; the convergence of the actual valve timing VTA at the target valve timing VTT retarded; the driving performance was spoiled; and the exhaust gas was deteriorated.

On the contrary, when the gain K1 corresponding to the integral operation was set to be a small value to the extent of not causing an unstable control, the steady-state deviation between the target valve timing VTT and the actual valve timing VTA appears in cases that the correction value to integration ΣKI was initialized at the time just after an electric power is applied to ECU 100 and the actual holding current was changed depending on changes of operating conditions as shown in FIG. 27. This steady-state deviation could not be eliminated for a long time, whereby there are problems that the driving performance was spoiled; and the exhaust gas was deteriorated.

SUMMARY OF THE INVENTION

It is an object of the present invention to solve the above-mentioned problems inherent in the prior art and to provide a valve timing controlling device of internal combustion engine in which the actual valve timing VTA can stably follow up changes of the target valve timing VTT.

Another object of the present invention to provide a valve timing controlling device of internal combustion engine by which the actual valve timing VTA can be converged at the target valve timing VTT within a short time even in cases that the correction value to integration ΣKI is initialized at the time just after an electric power is applied to ECU 100 and the actual holding current HLD in OCV 80 varies by changes of operating conditions and so on.

According to a first aspect of the present invention, there is provided a valve timing controlling device of internal combustion engine having an intake valve and an exhaust valve driven at a predetermined timing in synchronism with a rotation of the internal combustion engine for opening and closing an intake pipe and an exhaust pipe connected to a combustion chamber comprising:

means for detecting operating conditions of the internal combustion engine;

means for calculating a target valve timing with respect to the operating conditions of the internal combustion engine based on a result of detection from the means for detecting operating conditions;

means for varying a valve timing of opening and closing at least one of the intake valve or the exhaust valve;

means for detecting an actual valve timing of the valve or the valves of which opening and closing timing was varied;

means for controlling actual valve timing which generates a controlled variable for controlling the means for varying valve timing based on a value relating to a deviation between the target valve timing and the actual valve timing;

means for calculating a difference of integrations based on a value relating to the deviation between the actual valve timing and the target valve timing;

means for controlling integration which calculates a correction value to the integrations by integrating the difference of integrations in order to correct the controlled variable for the means for varying valve timing generated by the means for controlling actual valve timing; and means for terminating the integration of the means for controlling integration when the actual valve timing varies so as to follow the target valve timing.

According to a second aspect of the present invention, there is provided the valve timing controlling device of internal combustion engine, wherein said means for terminating integration includes a means for judging varied rate which judges whether or not a varied rate of the actual valve timing is a predetermined rate for judging termination of integration or more; and the integration in the means for controlling integration is terminated when the actual valve timing is judged to vary so as to meet the target valve timing at the predetermined rate for judging termination of integration or more.

According to a third aspect of the present invention, there is provided the valve timing controlling device of internal combustion engine, wherein the means for judging varied rate sets the predetermined rate for judging termination of integration small when an absolute value relating to the deviation between the actual valve timing and the valve timing is small, in comparison with when the absolute value is large.

According to a fourth aspect of the present invention, there is provided the valve timing controlling device of internal combustion engine, wherein the means for judging varied rate sets the predetermined rate for judging termination of integration small while a predetermined period lapses after the absolute value relating to the deviation between the actual valve timing and the target valve timing becomes a predetermined value, in comparison with after the predetermined period lapses.

According to a fifth aspect of the present invention, there is provided the valve timing controlling device of internal combustion engine, wherein the means for judging varied rate sets the predetermined rate for judging termination of integration small while a predetermined period lapses after the absolute value relating to the deviation between the actual valve timing and the target valve timing increases, in comparison with after the predetermined period lapses.

According to a sixth aspect of the present invention, there is provided the valve timing controlling device of internal combustion engine, wherein said means for calculating difference of integrations calculates the difference of integrations to be small when the absolute value relating to a deviation between the actual valve timing and the target valve timing is small, in comparison with when the absolute value is large.

According to a seventh aspect of the present invention, there is provided the valve timing controlling device of internal combustion engine, wherein the means for calculating difference of integrations calculates the difference of integrations to be small while a predetermined period lapses after the absolute value relating to the deviation between the actual valve timing and the target valve timing becomes a predetermined value, in comparison with after the predetermined period lapses.

According to an eighth aspect of the present invention, there is provided the valve timing controlling device of internal combustion engine, wherein the means of calculating difference of integrations calculates the difference of integrations to be small while a predetermined period lapses after the absolute value relating to the deviation between the actual valve timing and the target valve timing increases, in comparison with after the predetermined period lapses.

According to a ninth aspect of the present invention, there is provided the valve timing controlling device of the internal combustion engine, wherein said means for calculating actual valve timing maintains said controlled variable for controlling said means for varying valve timing at a predetermined value when the absolute value relating to the deviation between the actual valve timing and the target valve timing is less than a predetermined value.

BRIEF DESCRIPTION OF THE DRAWINGS

A more complete application of the invention and many of the attendant advantages thereof will be readily obtained as the same becomes better understood by reference to the following detail description when considered in connection with the accompanying drawings, wherein:

FIG. 12 is one example of a timing chart for showing a relation among the crank angle signal, the cam angle signal and the actual valve timing;

DETAILED DESCRIPTION OF THE PREFERRED EMBODIMENTS

A detailed explanation will be given of preferred embodiment of the present invention in reference to FIGS. 1 through 21 as follows, wherein the same numeral references are used for the same or the similar portions and description of these portions is omitted.

EXAMPLE 1

Figure 1:
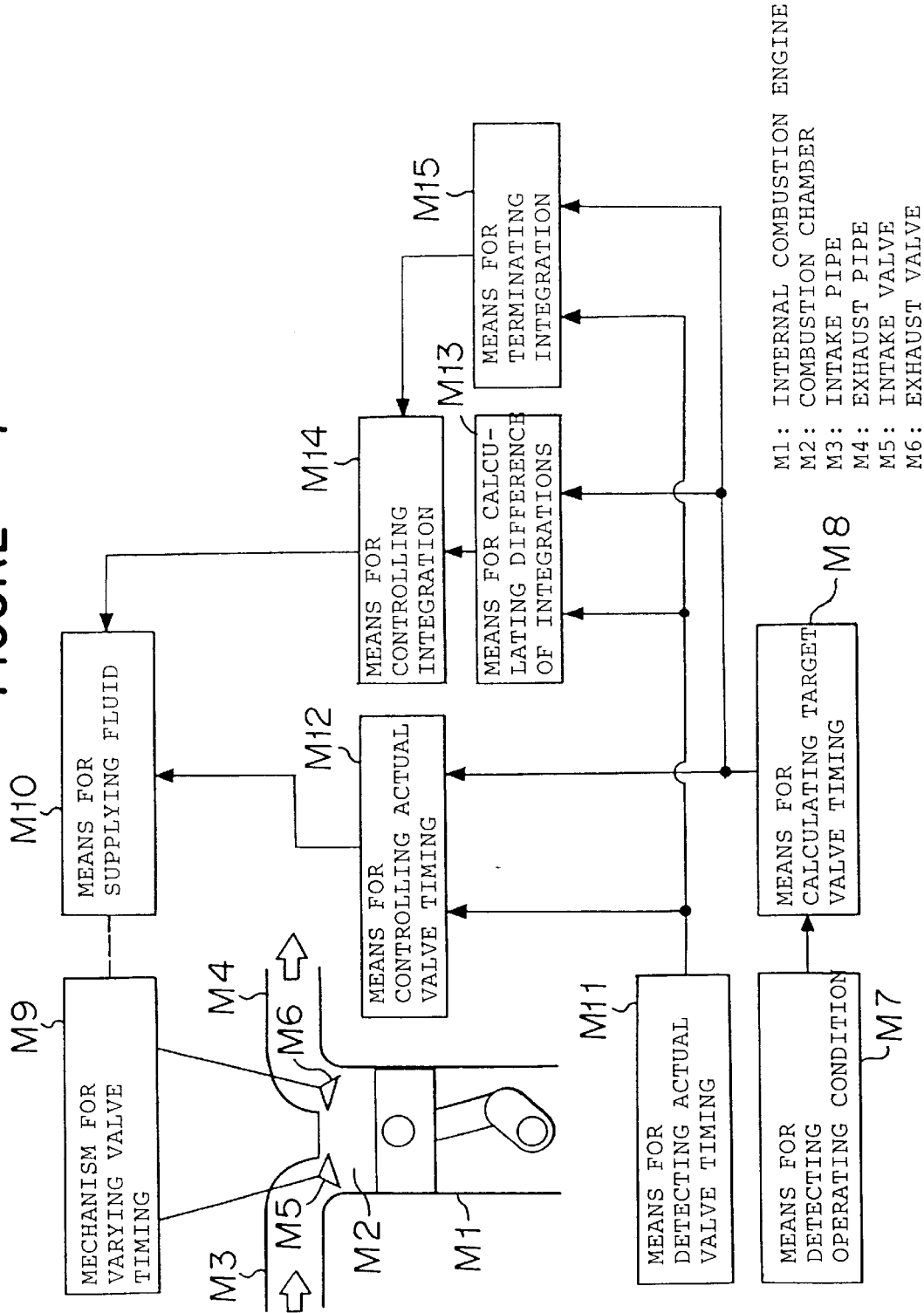
FIG. 1 is a schematical view for showing a basic structure of the present invention.
Figure 2:
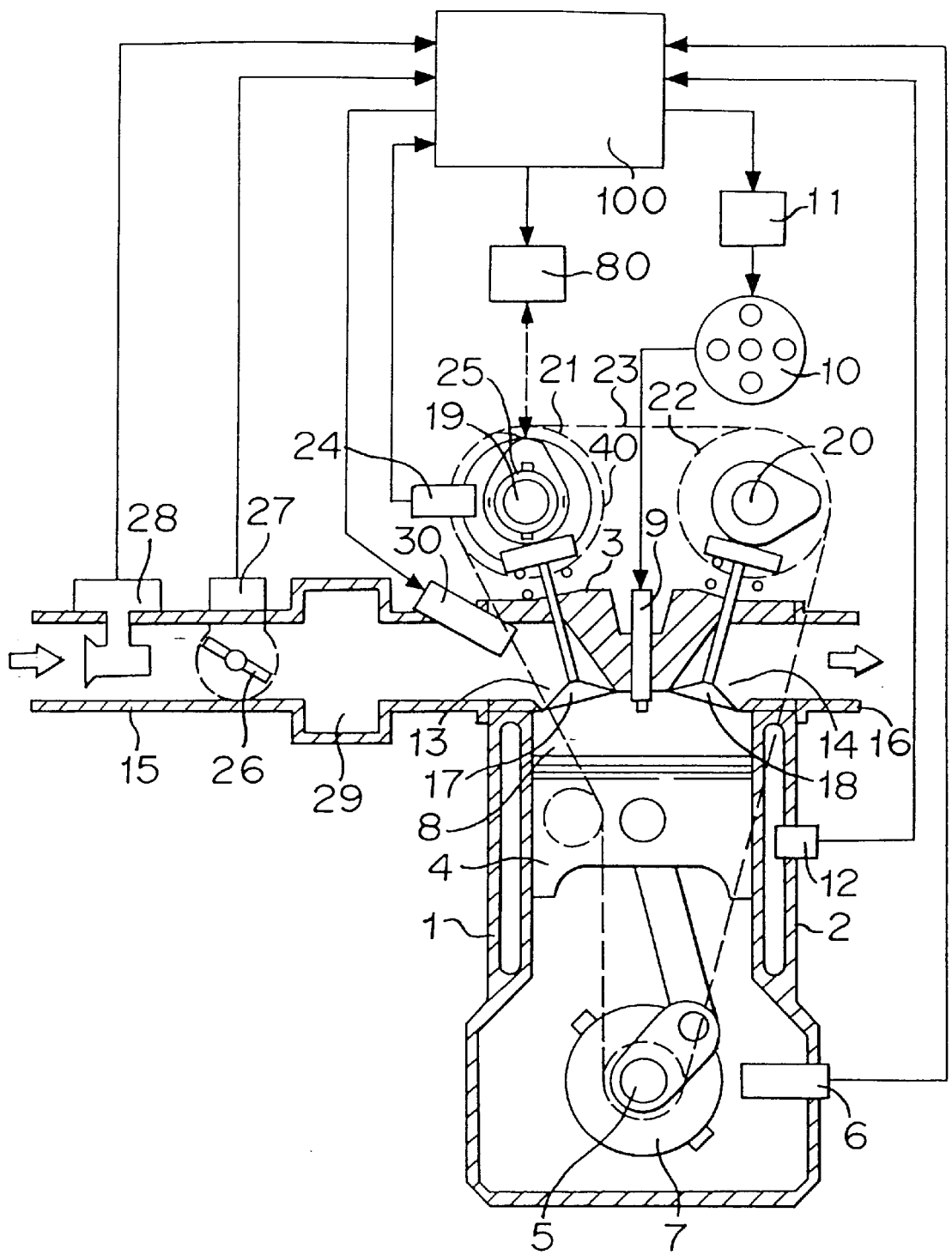
FIG. 2 is a schematical view for showing a gasoline engine system having a mechanism for varying valve timing according to Examples 1 and 2 of the present invention.
Figure 3:
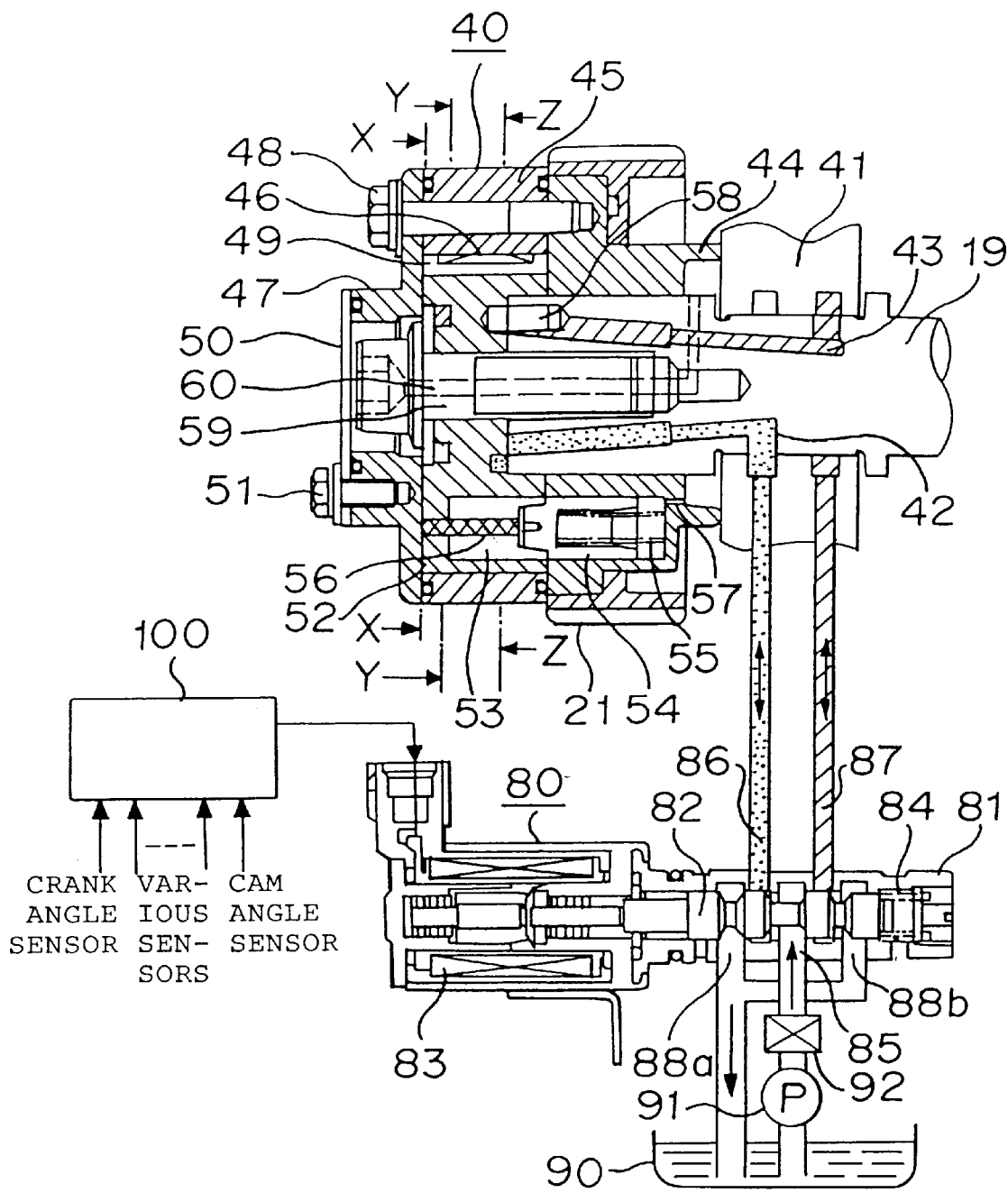
FIG. 3 is a side view in section for showing the mechanism for varying valve timing and means for supplying working oil which drives and controls a mechanism for varying valve timing.
Figure 4:
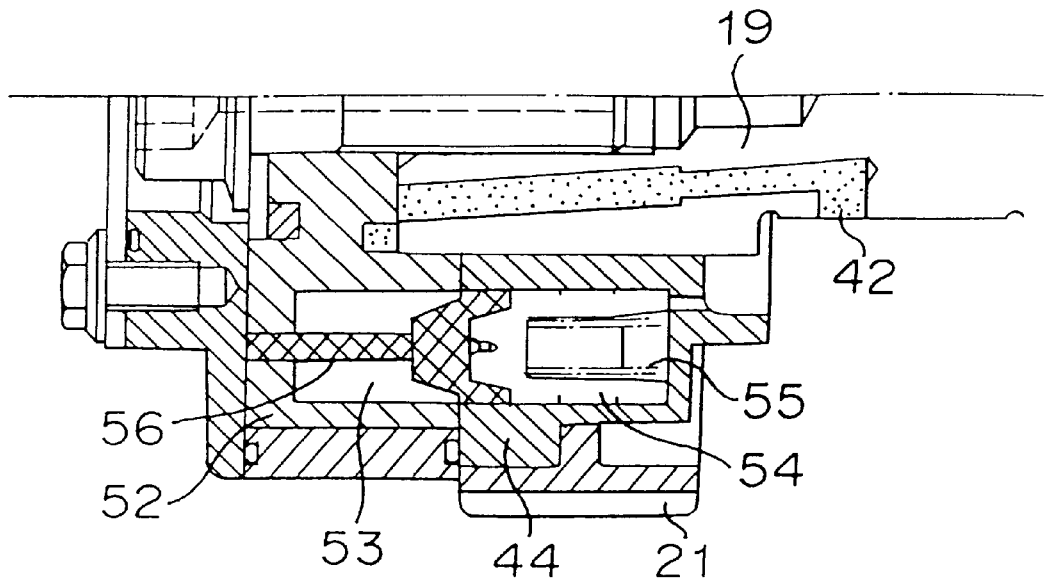
FIG. 4 is an enlarged view of a part of FIG. 3 for explaining the mechanism for varying valve timing.
Figure 5:
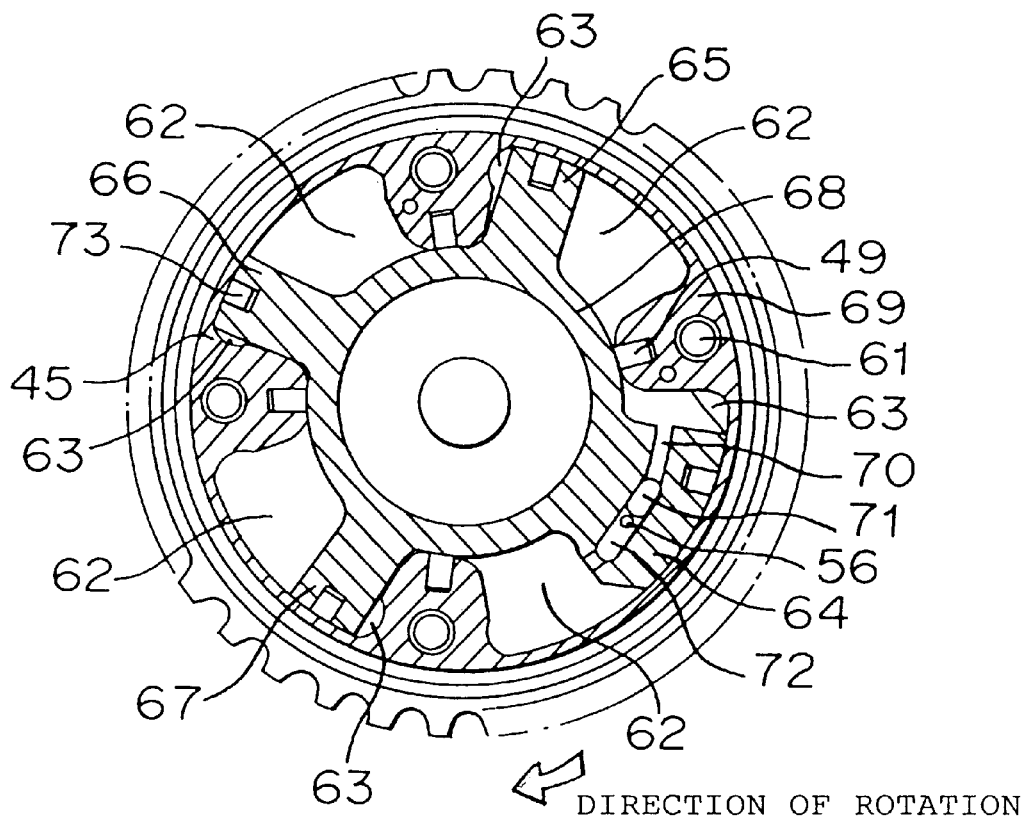
FIG. 5 is a cross-sectional view taken along a line X—X of FIG. 3.
Figure 6:
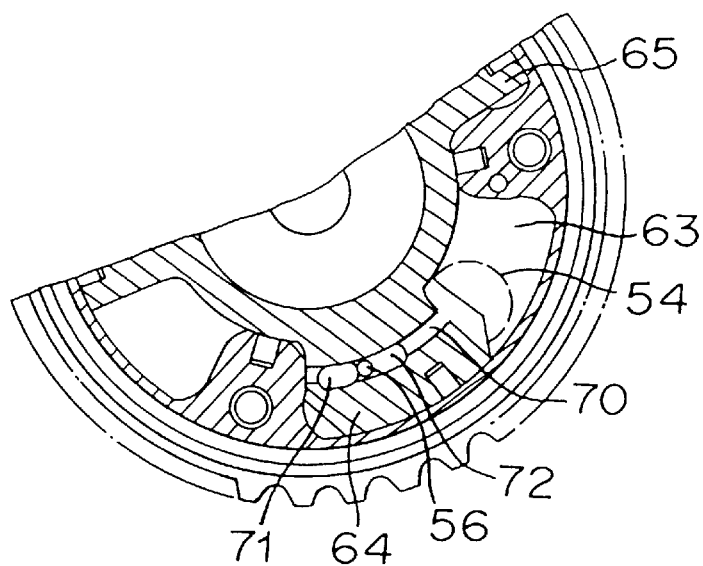
FIG. 6 shows one of states of movable slide plate according to Examples 1 and 2 for explanation.
Figure 7:
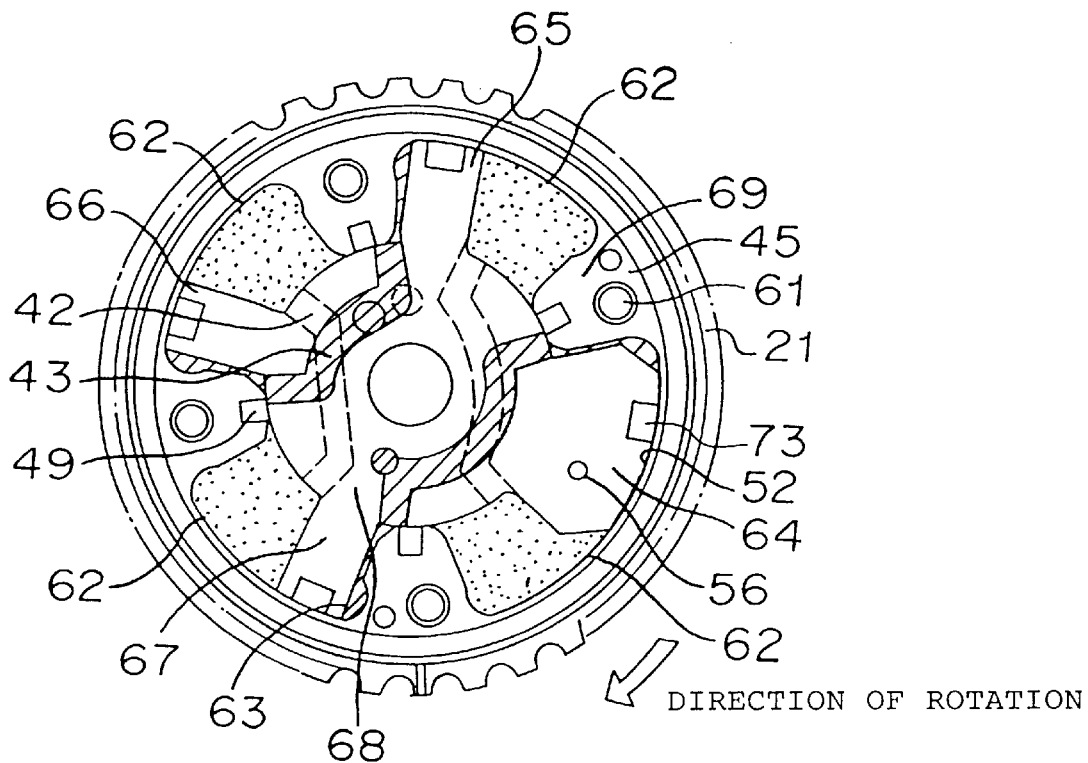
FIG. 7 is a cross-sectional view taken along a line Y—Y in FIG. 3.
Figure 8:
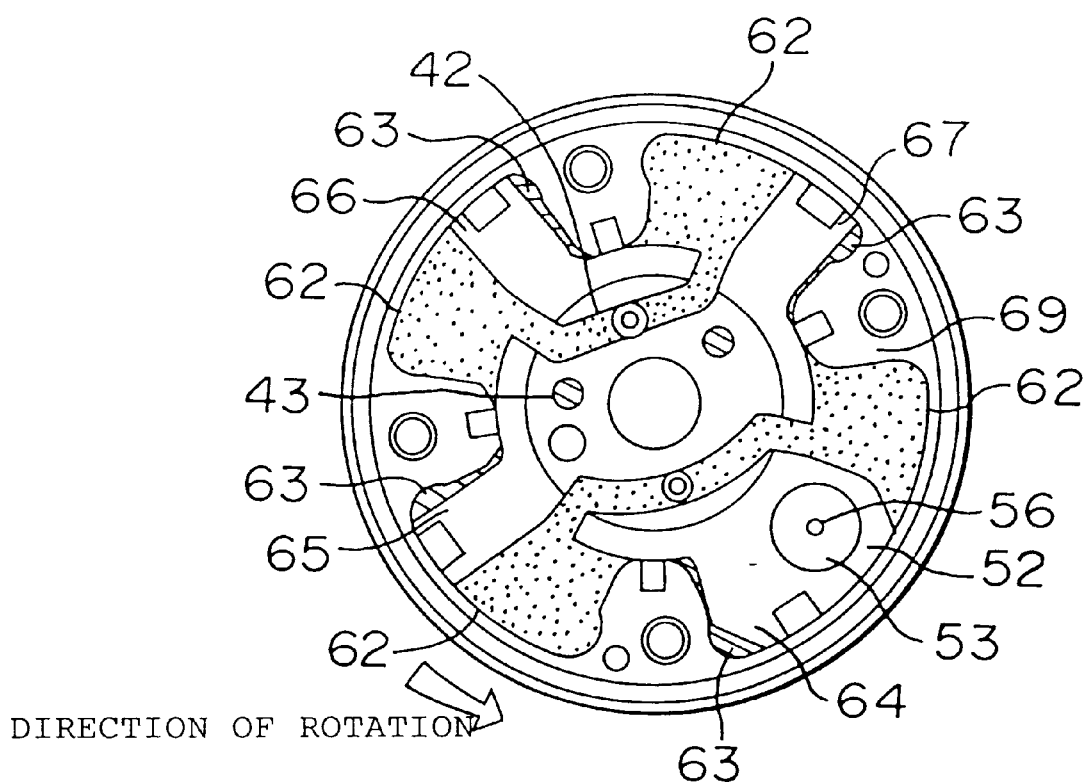
FIG. 8 is a cross-sectional view taken along a line Z—Z in FIG. 3.
Figure 9A:
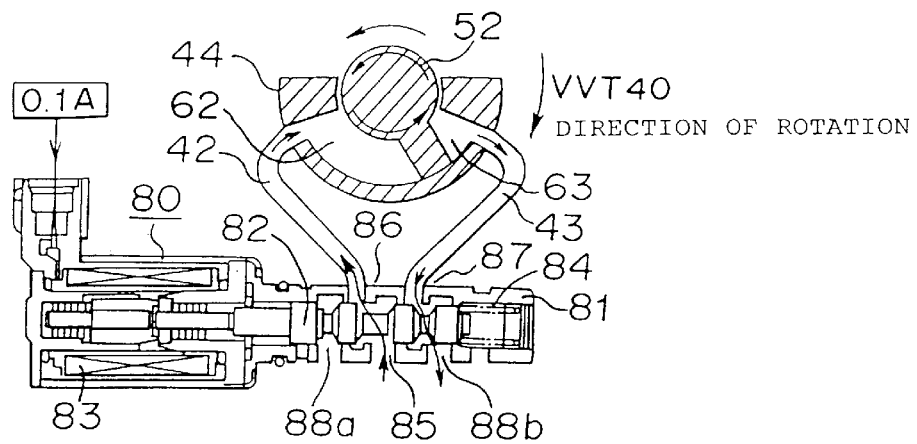
FIG. 9a is a schematical view for showing movement of the oil control valve according to Examples 1 and 2 of the present invention.
Figure 9B:
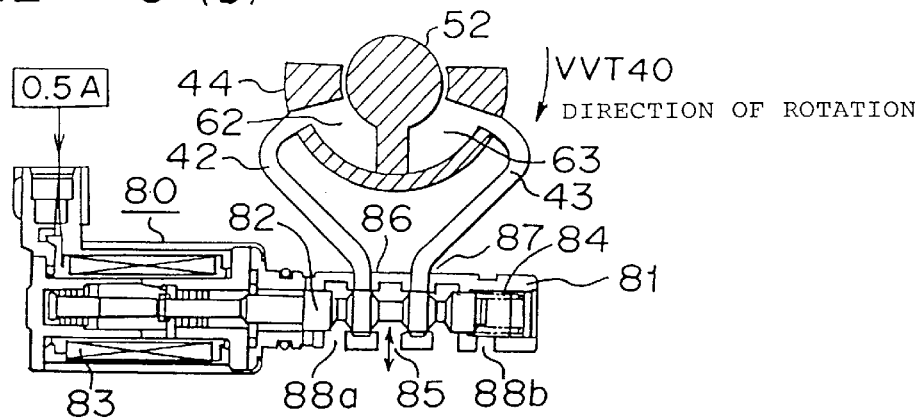
FIG. 9b is a schematical view for showing movement of the oil control valve according to Examples 1 and 2 of the present invention.
Figure 9C:
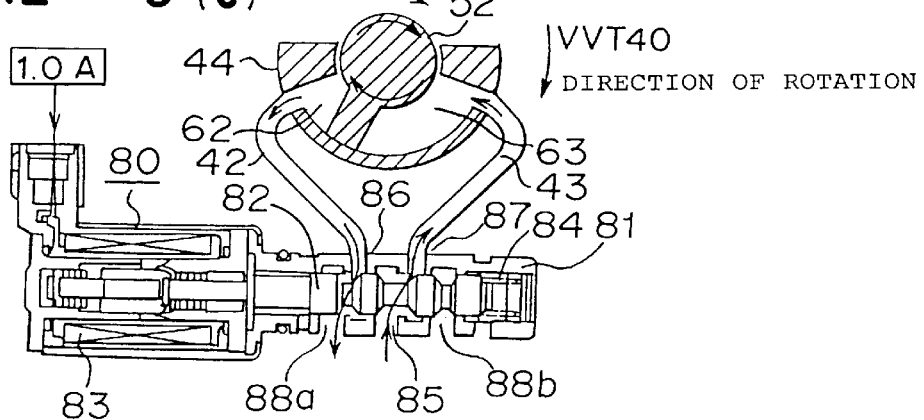
FIG. 9c is is a schematical view for showing movement of the oil control valve according to Examples 1 and 2 of the present invention.
Figure 10:
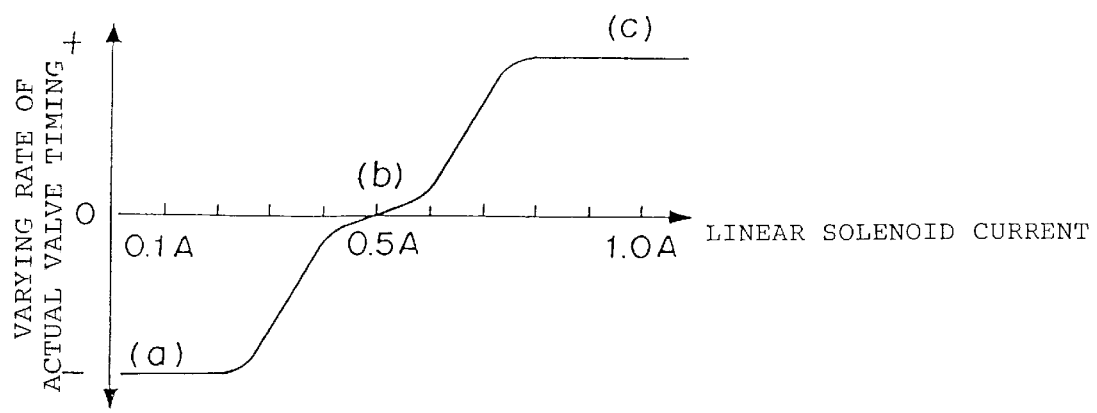
FIG. 10 is a diagram for showing a relation between the linear solenoid current and the varying rate of the actual valve timing according to Examples 1 and 2.
Figure 11:
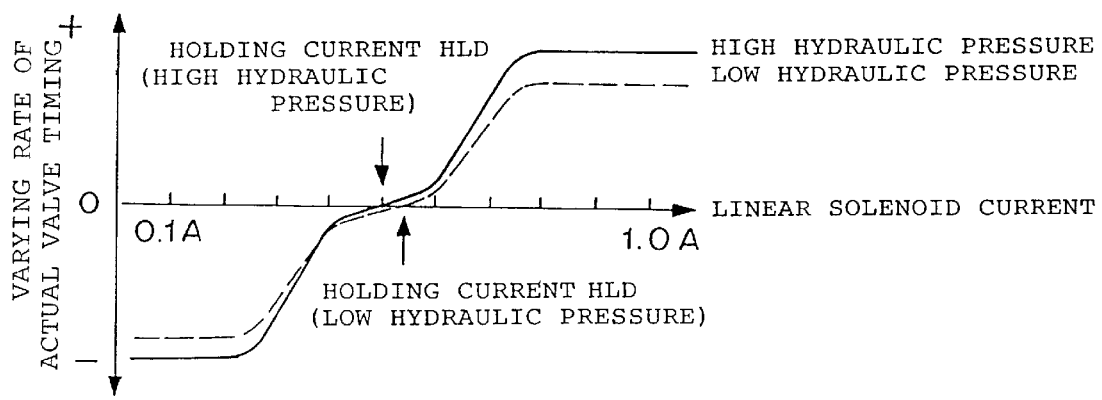
FIG. 11 is a diagram for showing a scattering of the relation between the linear solenoid current and the varying rate of the actual valve timing.

FIG. 1 is a schematical view for showing a basic structure of the present invention; FIG. 2 is a schematical view for showing a gasoline engine system having a mechanism for varying valve timing according to this Example; FIG. 3 is a cross-sectional view around intake camshaft provided with VVT 40 and also explains a structure of means for supplying working oil which drives and controls VVT 40; FIG. 4 explains a state that an oil pressure is applied to a plunger 54 through a plunger oil path 56; FIG. 5 is a cross-sectional view taken along a line X—X of FIG. 3 viewed in the direction of the arrow for explanation; FIG. 6 shows movements of slide plate 71; FIG. 7 is a cross-sectional view taken along a line Y—Y of FIG. 3 viewed in a direction of arrow for explanation; FIG. 8 is a cross-sectional view taken along a line Z—Z in FIG. 3 viewed in the direction of the arrow for explanation; FIGS. 9a through 9c explain operations of OCV 80; FIG. 10 is a diagram for showing a relation between a linear solenoid current and a varying rate of actual valve timing; FIG. 11 is a diagram for showing a scattering of relations between the linear solenoid current and the varying rate of the actual valve timing; and FIG. 12 is a timing chart for explaining a relation of phase between a crank angle signal and a cam angle signal and a method of calculating the actual valve timing VTA. The structure and the operations are the same as those described about the prior art in the above, therefore the explanation of the structure and the operations are omitted.

Figure 13:
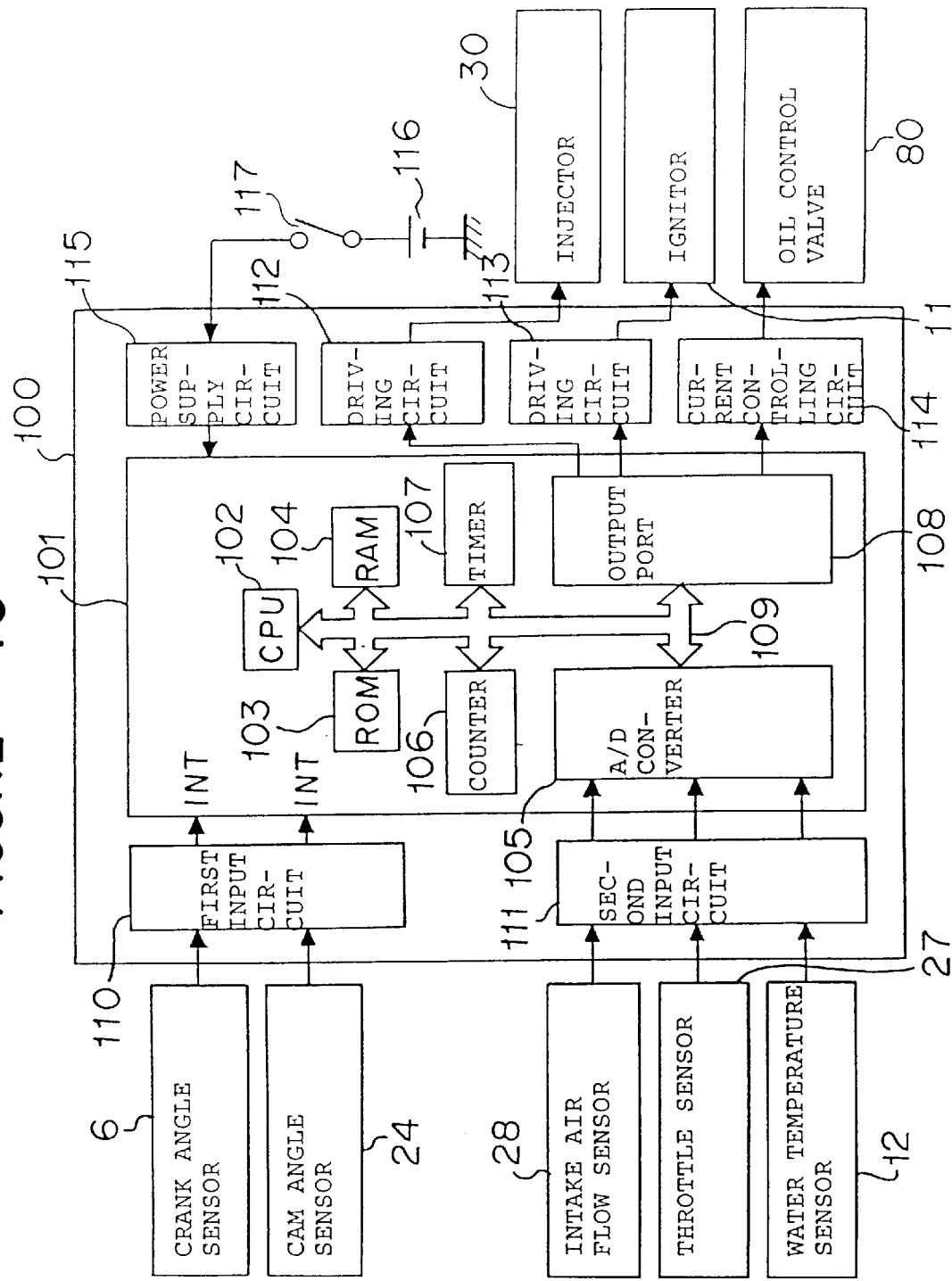
FIG. 13 is a schematical view for showing the inner structure of electrical controlling unit according to Examples 1 and 2 of the present invention.
Figure 17:
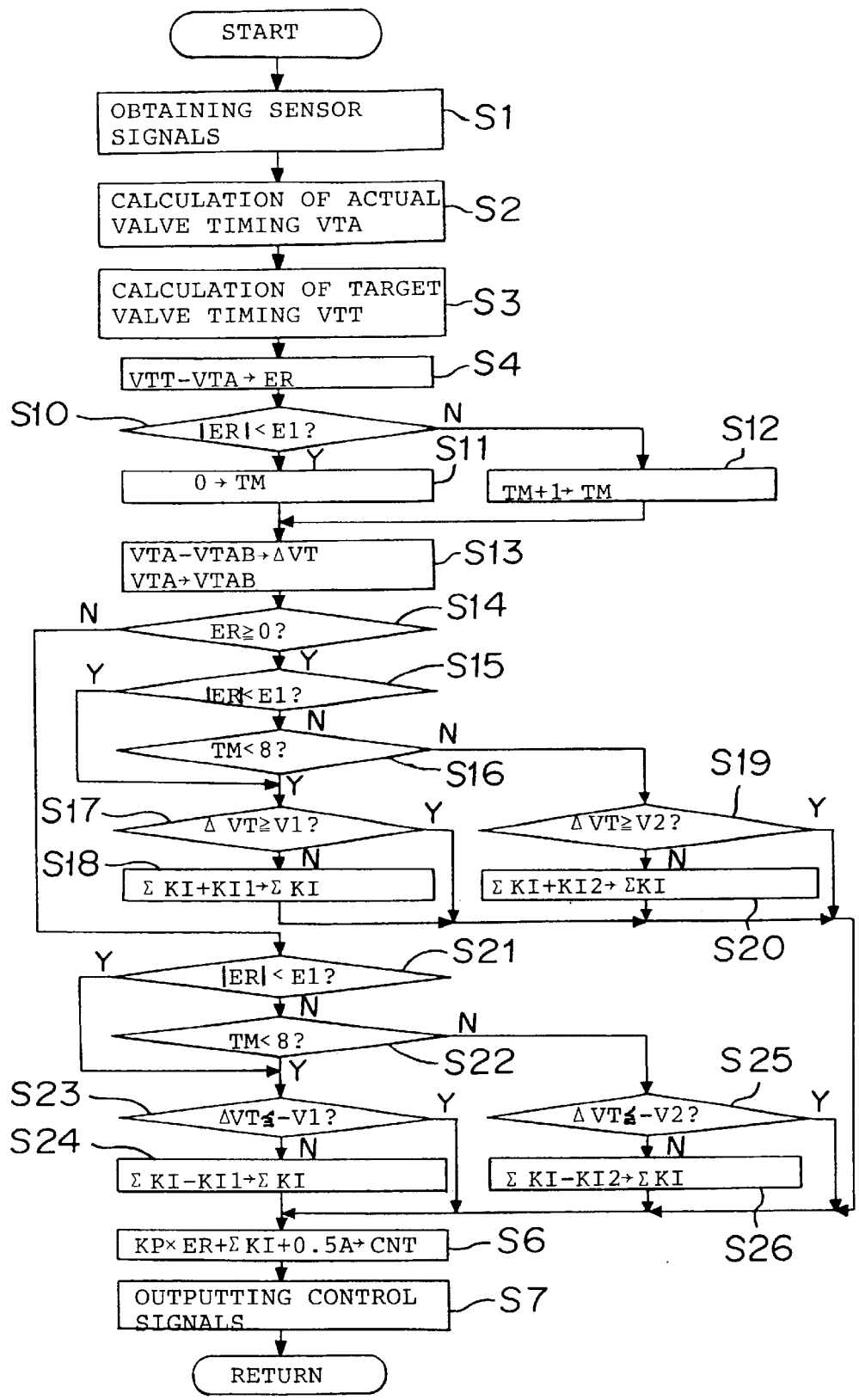
FIG. 17 is a flow chart for explaining operations in accordance with Example 1.

FIG. 13 shows an inner structure of ECU 100 shown in FIG. 2. Because this structure has the same structure described about the prior art except that a control program and data of a flow chart shown in FIG. 17 are stored in ROM 103, the description thereof is omitted.

Figure 14:
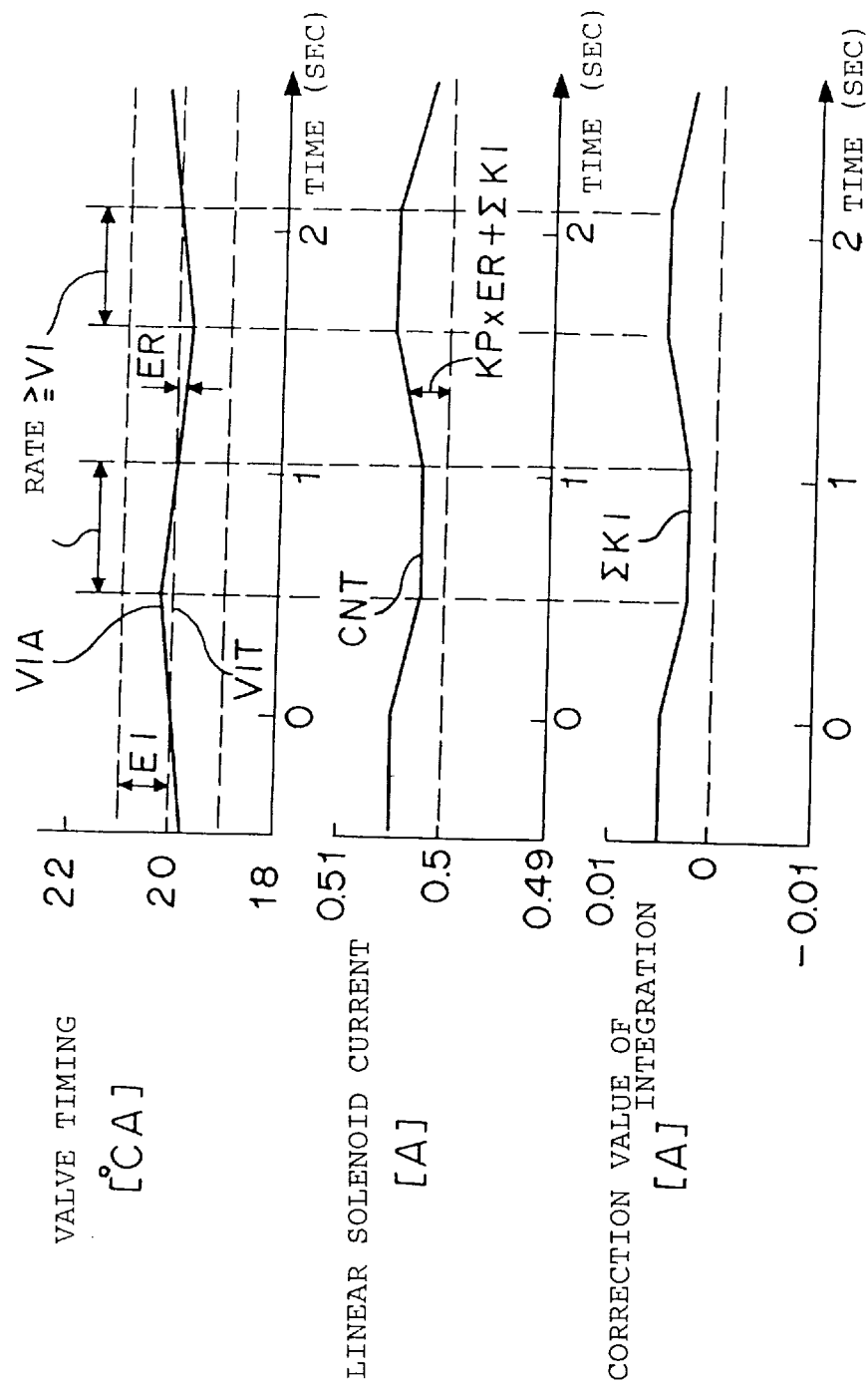
FIG. 14 is a timing chart for explaining operations in accordance with Example 1.

In the next, an operation of a valve timing controlling device of internal combustion engine according to this Example is described with reference to FIGS. 14 through 16. FIG. 14 is a timing chart for showing a controlling operation in a state that the actual valve timing VTA is converged at the vicinity of the target valve timing VTT. When an absolute value of deviation ER between the target valve target VTT and the actual valve timing VTA is less than the predetermined value E1 (for example, 1° CA), the actual valve timing is judged to be substantially converged at the target valve timing, wherein the difference of integrations is set to be small value KI1 (for example, 0.1 mA) as small as it can manage a minute change of a holding current in OCV 80. However, as long as the actual valve timing VTA is heading toward the target valve timing VTT regardless of its pace, it is not necessary to further increase or further decrease a correction value of integration ΣK1. Therefore, integration of the difference of integrations is stopped when the actual valve timing VTA is heading toward the target valve timing in a pace faster than a predetermined rate for judging termination of integration V1 (for example, 0.01° CA/25 ms).

Figure 15:
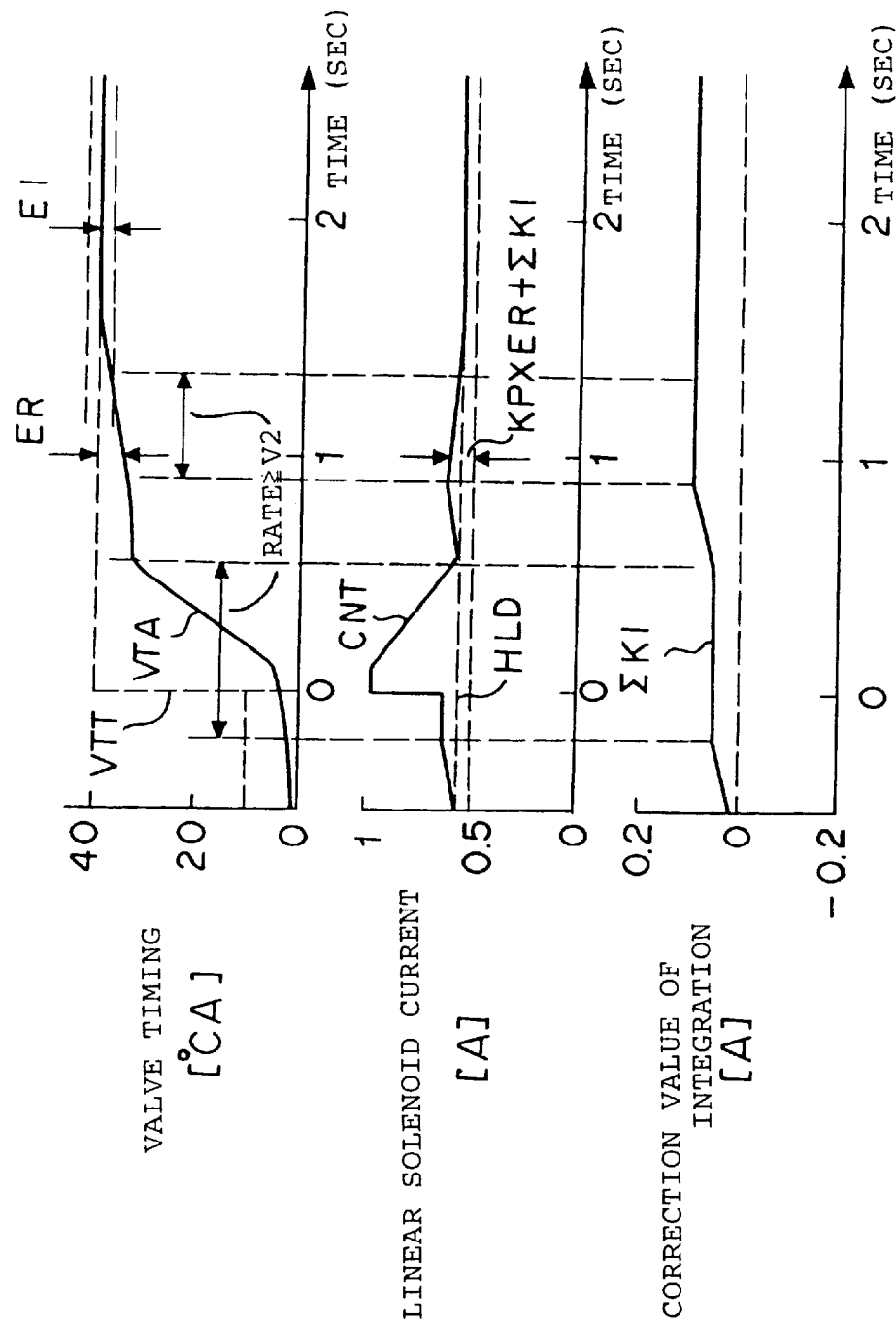
FIG. 15 is a timing chart for explaining operations in accordance with Example 1.

FIG. 15 is a timing chart for showing a controlling operation in a state that a steady-state deviation occurs between the actual valve timing VTA and the target valve timing VTT. When the absolute value of the deviation ER between the target valve timing VTT and the actual valve timing VTA is the predetermined value E1 or more and the actual valve timing VTA is not heading toward the target valve timing VTT at a rate of the predetermined rate for judging termination of integration or more, it is judged that the steady-state deviation occurs between the target valve timing VTT and the actual valve timing VTA and set the difference of integrations to be a value KI2 (for example, 1 mA), which is larger than the above-mentioned KI1 in order to rapidly control the steady-state deviation so that it is eliminated. However, if the predetermined rate for judging termination of integration remains said V1, a varying rate of the actual valve timing VTA does not exceed V1 because the integration of the difference of integrations is terminated at the time that the varying rate of the actual valve timing exceeds V1 even though the difference of integrations is increased as much as possible. Therefore, when the absolute value of the deviation ER is the predetermined value E1 or more, the actual valve timing VTA can approach the target valve timing at a rate of V2 by setting the rate of terminating integration a larger value V2 (for example, 0.1° CA/25 ms) than V1 along with the increment of the difference of integrations.

Figure 16:
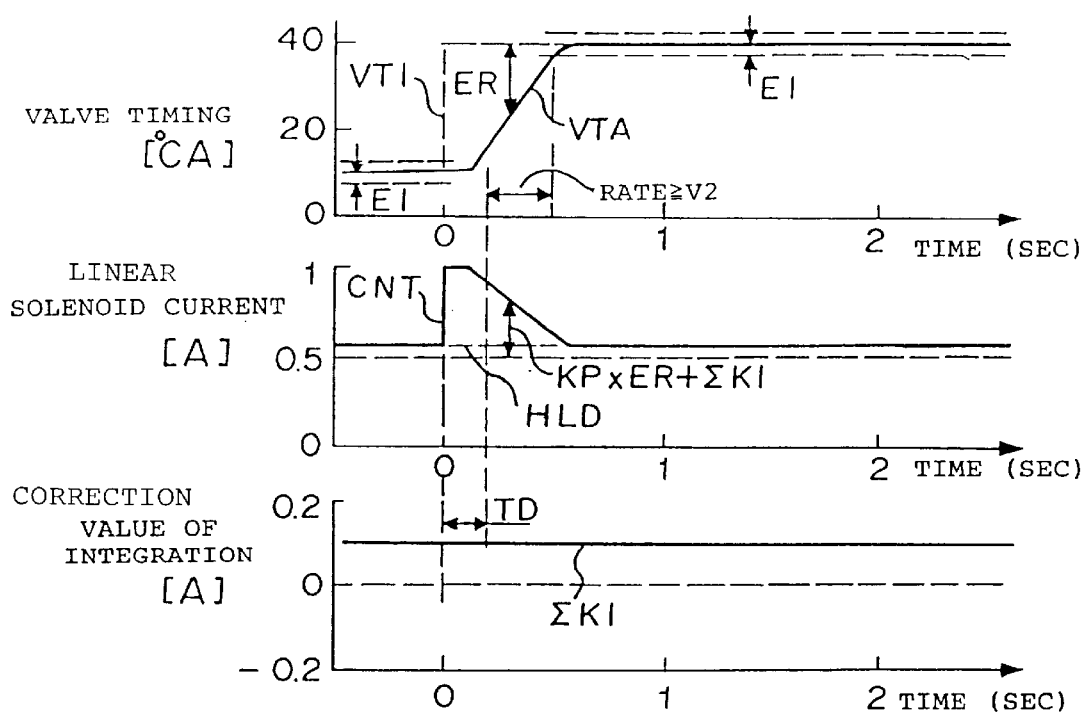
FIG. 16 is a timing chart for explaining operations in accordance with Example 1.

FIG. 16 is a timing chart for showing a controlling operation of a step response in a state that the correction value of integration is stable. As shown in this Figure, there is a case that the actual valve timing VTA does not move or moves slowly for a while because of transfer lag of the working oil or the like after the target valve timing VTT is changed. Under this situation, the absolute value of the deviation ER between the target valve timing VTT and the actual valve timing VTA is the predetermined value E1 or more. Therefore, if the above-mentioned control is conducted, it is erroneously judged that the steady-state deviation occurs, whereby the difference of integration is set to be KI2, and the rate of terminating integration is set to be V2, whereby the correction value of integration ΣK1, which is unnecessary to increase or decrease, is increased or decreased. Therefore, for a predetermined time of TD (for example, 0.2 sec) after the absolute value of the deviation ER is changed from less than the predetermined value E1 to the predetermined value E1 or more, the difference of integration is set to be KI1 and the rate for judging termination of integration is set to be V1 on an equality with the case that the absolute value of the deviation ER is less than the predetermined value E1.

Accordingly, it is possible to suppress the increment and the decrement of the correction value of integration ΣK1 in a state that the actual valve timing VTA does not start to move after the target valve timing VTT is changed; and once the actual valve timing VTA start to move toward the target valve timing regardless of its rate, the integration of the difference of integrations is stopped, whereby the correction value of integration ΣK1 scarcely varies. After the predetermined time TD is lapsed, the integration of the difference of integrations is stopped as well because the actual valve timing VTA has already moved toward the target valve timing VTT at a varying rate of V2 or more. Further, although when the actual valve timing VTA approaches the target valve timing VTT, the varying rate becomes low, in a case that the deviation ER from the target valve timing VTT enters in a region of less than the predetermined value V1, the rate for judging termination of integration becomes V1 and the difference of integrations becomes KI1, which are small values respectively. In this case, the actual valve timing VTA also stably converges at the target valve timing VTT without increasing and decreasing unnecessarily the correction value of integration ΣK1.

Figure 25:
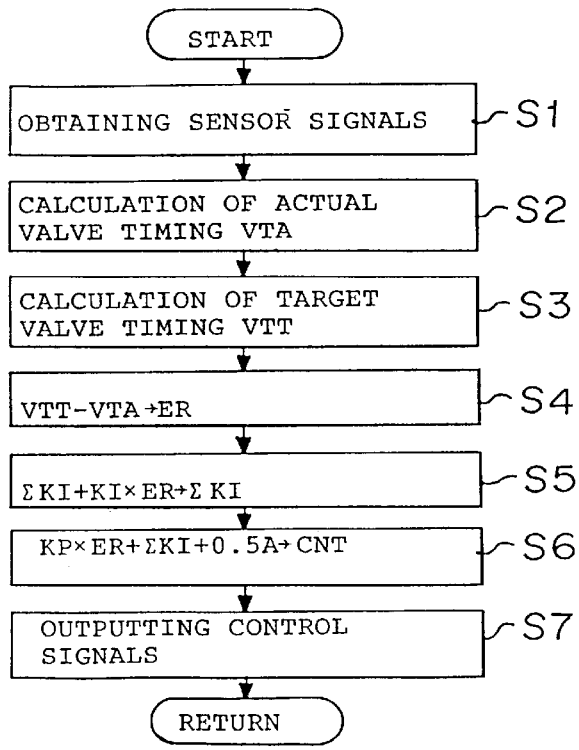
FIG. 25 is a flow chart for showing operations of a conventional device.
Figure 26:
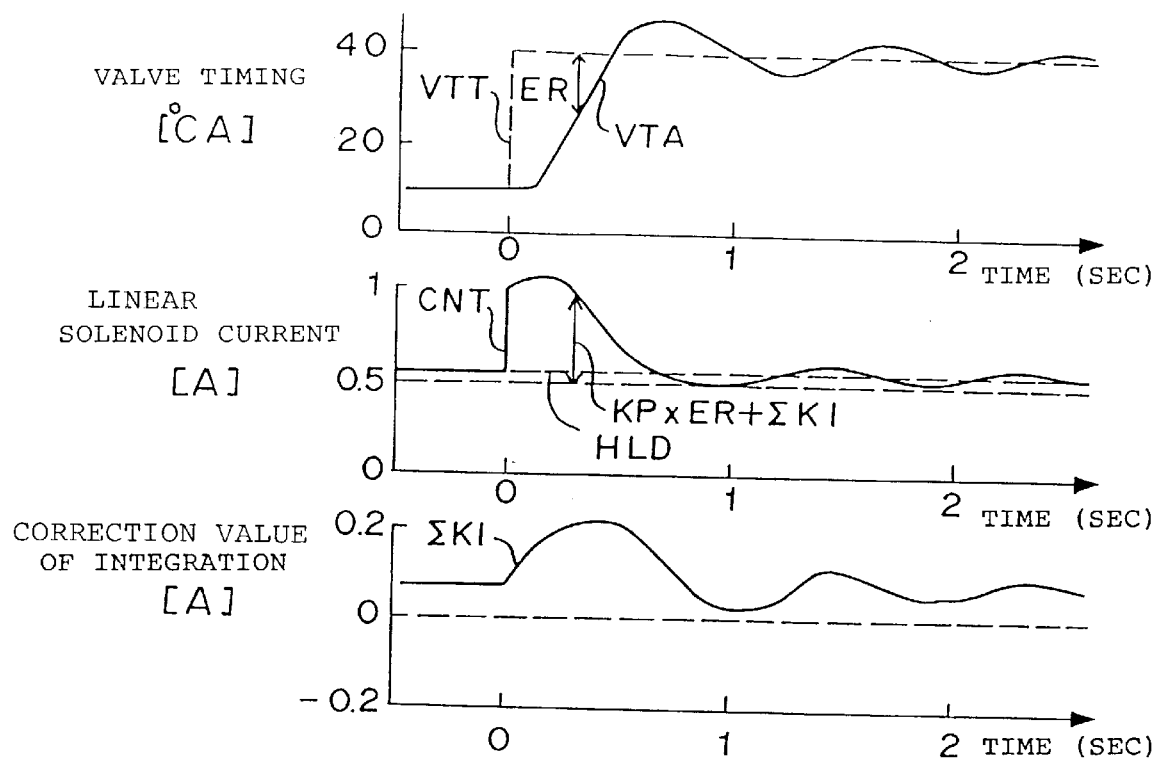
FIG. 26 is a timing chart for explaining problems of a conventional device.
Figure 27:
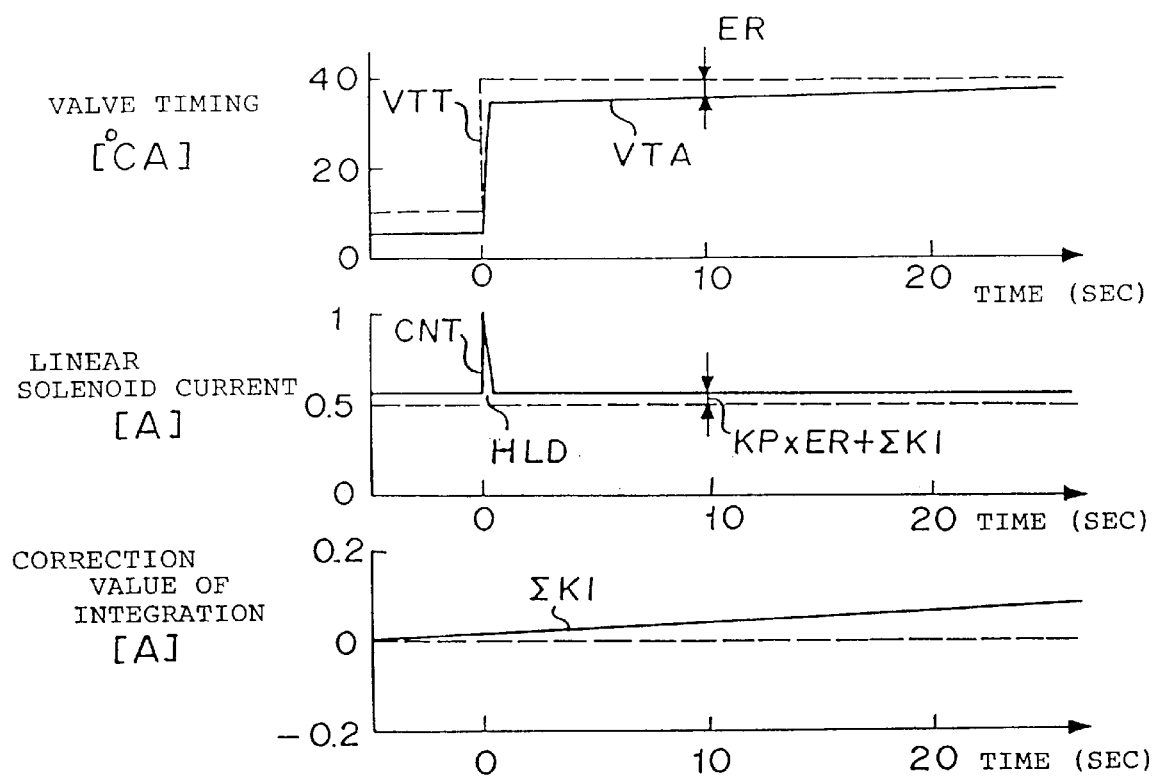
FIG. 27 is a timing chart for explaining problems of a conventional device.

The above operation will be described with reference to the flow chart of FIG. 17. In FIG. 17, the Step S5 of the flow chart of FIG. 25 showing the operation of the conventional device is substituted by Steps S10 through S26, wherein a portion of processing the same content as that of FIG. 25 is represented by the same numeral and detailed description thereof is omitted. The flow chart of FIG. 17 is processed at every 25 ms in CPU 102.

In Step S1 of FIG. 17, a period of crank angle signal T, a revolution number of engine NE, a time of phase difference TVT, a quantity of intake air QA, an opening degree of throttle TVO, a temperature of cooling water THW and so on are inputted from varios sensors of means for detecting operating conditions. In the next, the actual valve timing VTA is calculated in Step S2 performed by the means for detecting actual valve timing. In Step S3, the target valve timing VTT is calculated based on the revolution number of engine NE, the quantity of intake air QA, the opening degree of throttle TVO, the temperature of cooling water THW and so on, which were obtained in Step S1, wherein Step S1 corresponds to the means for calculating target valve timing. In Step S4, the deviation ER between the target valve timing VTT and the actual valve timing VTA is calculated in accordance with Formula 4, which deviation relates to the difference between the target valve timing and the actual valve timing. Incidentally, Steps S1 through S4 are the same processes as those in the conventional device shown in FIG. 25.

In Step 10, when the absolute value of the deviation ER is judged to be less than the predetermined value E1 as a result of judging whether or not absolute value of the deviation ER is less than the predetermined value E1, a timer TM is reset to be an initial value of 0 in Step S11. On the other hand, when the absolute value of the deviation ER is judged to be the predetermined value ER1 or more in Step S10, the timer TM is increased by 1 in Step S12. The timer TM is provided to count a predetermined time, namely a time lapsed after the absolute value of the deviation ER is changed from less than the predetermined value E1 to the predetermined value E1 or more (1 LSB=25 ms), after Steps in Steps S10 through S12.

After completed Step S11 or Step S12, a value ΔVT, which is obtained by subtracting the prior actual valve timing to the present actual valve timing VTA by 25 ms VATB from present the actual valve timing VTA, is stored, and thereafter the present actual valve timing VTA is stored in the prior actual valve timing by 25 ms, wherein ΔVT designates the amount of change of the actual valve timing VTA during 25 ms, namely the varied rate of the actual valve timing VTA.

In Step S14, the deviation ER is judged whether or not it is 0 or more. If the deviation ER is 0 or more, namely the actual valve timing VTA is retarded more than the target valve timing VTT, Step S15 is selected. In Step S15, the absolute value of the deviation ER is judged whether or not less than the predetermined value E1. In a case that the absolute value of the deviation ER is judged to be less than the predetermined value E1, Step S17 is selected. In a case that the absolute value of the deviation ER is judged to be E1 or more in Step S15, Step S16 is selected. In Step S16, it is judged whether or not the timer TM is less than 8, and when the timer TM is judged to be less than 8, namely the time lapsed after the absolute value of the deviation ER is changed from less than the predetermined value E1 to the predetermined value E1 or more is less than 0.2 sec (25 ms×8), Step S17 is selected.

In Step S17, the varied rate ΔVT is judged whether or not V1 or more. When the varied rate ΔVT is judged less than V1, it can be inferred that the actual valve timing VTA is heading to the target valve timing VTT at a rate of less than VI/25 ms or that the actual valve timing VTA is diverting from the target valve timing VTT, wherein a predetermined value KI1 is added to the correction value of integration ΣKI in Step S18 and Step S6 is selected. In a case that the varied rate ΔVT is judged to be V1 or more, it can be inferred that the actual valve timing VTA is heading to the target valve timing at a rate of V1/25 ms or more, wherein Step S6 is selected without processing Step S18.

On the other hand, in a case that the timer TM is judged to be 8 or more in Step 16, namely the time lapsed after the absolute value of the deviation ER is changed from less than predetermined value E1 to the predetermined value E1 or more is 0.2 sec or more, Step S19 is selected. In Step S19, it is judged whether or not the varied rate ΔVT is V2 or more. In a case that the varied rate ΔVT is less than V2, it can be inferred that the actual valve timing VTA is heading to the target valve timing VTT at a rate of less than V2/25 ms or that the actual valve timing VTA is diverting from the target valve timing VTT, wherein a predetermined value KI2 is added to the correction value of integration ΣKI in Steps S20 and Step S6 is selected. In a case that the varied rate ΔVT is V2 or more in Step S19, it can be inferred that the actual valve timing VTA is heading to the target valve timing VTT at a rate of V2/25 ms or more, wherein Step S20 is skipped and Step S6 is selected.

Incidentally, Steps S17 and S19 correspond to a means for a judging varied rate; Steps S17 and S19 correspond to a means for a terminating integration; Steps S18 and S20 correspond to a means for calculating difference to integration; Steps S18 and S20 correspond to a means for controlling integration; reference V1 designates the rate for judging termination of integration; reference V2 designates the rate for judging termination of integration; reference KI1 designates the difference of integrations; and reference KI2 designates the difference of integrations.

In a case that the deviation ER is less than 0, namely the actual valve timing VTA is judged to be advanced more than the target valve timing VTT in Step S14, Step S21 is selected. In a case that the absolute valve of the deviation ER is judged less than the predetermined value E1 after judging whether or not the absolute value of the deviation ER is less than the predetermined value E1, Step S23 is selected. In a case that the absolute value of the deviation ER is judged to be E1 or more in Step S21, Step S22 is selected to judge whether or not the timer TM is less than 8. In a case that the timer TM is less than 8, namely the time lapsed after the absolute value of the deviation ER is changed from less than the predetermined value E1 to the predetermined value E1 or more is judged less than 0.2 sec, Step S23 is selected.

In Step S23, the varied rate ΔVT is judged whether or not −V1 or less. In a case that the varied rate ΔVT is judged to be larger than −V1, it can be inferred that the actual valve timing VTA is heading to the target valve timing VTT at a rate of less than V1/25 ms or that the actual valve timing VTA is diverting from the target valve timing VTT, wherein the predetermined value KI1 is subtracted from the correction value of integration ΣKI in Steps S24 and Step S6 is selected. In a case that the varied rate ΔVT is judged to be −V1 or less in Step S23, it can be inferred that the actual valve timing VTA is heading to the target valve timing VTT at a rate of V1/25 ms or more, wherein Step S24 is skipped and Step S6 is selected.

On the other hand, in a case that the timer TM is judged to be 8 or more in Step S22, namely a lapsed time after the absolute value of the deviation ER is changed from less than the predetermined value E1 to the predetermined value E1 or more is judged to be 0.2 sec or more, Step S25 is selected. In Step S25, it is judged whether or not the varied rate ΔVT is -V2 or less, in a case that the varied rate ΔVT is larger than -V2, it is inferred that the actual valve timing VTA is heading to the target valve timing VTT at a rate of less than V2/25 ms or that the actual valve timing VTA is diverting from the target valve timing VTT. Therefore, in this case, the correction value of integration ΣKI is subtracted by a predetermined value of KI2 in Step S26 and Step S6 is selected. In a case that the varied rate ΔVT is judged to be -V2 or less in Step S25, it is inferred that the actual valve timing VTA is heading to the target valve timing VTT at a rate of V2/25 ms or more, wherein Step S6 is selected without processing Step S26.

In this, Steps S23 and S25 correspond to the means for judging varied rate; Steps S23 and S25 correspond to the means for terminating integration; Steps S24 and S26 correspond to means for calculating difference of integration; Steps S24 and S26 correspond to means for controlling integration; difference -V1 designates the rate for judging termination of integration; reference -V2 designates the rate for judging termination of integration; reference -KI1 designates the difference of integrations; and reference -KI2 designates the difference of integration.

After calculating the correction value of integration ΣKI by Steps S10 through S26 as in the above, a linear solenoid current CNT in OCV 80 is obtained by Formula 6. In Step S6, means for controlling actual valve timing works to provide the linear solenoid current CNT by adding a controlled variable of (KP×ER+0.5 A) obtained from the means for controlling actual valve timing and the correction value of integration of ΣKI obtained from the means for controlling integration. In Step S7, a duty signal corresponding to the linear solenoid current CNT in OCV 80 is outputted to an output port 108. Steps S6 and S7 perform the same processes as those in the conventional device shown in FIG. 25.

EXAMPLE 2

In Example 1, the difference of integrations is selected from a pair of values of KI1 and KI2 depending on whether or not the deviation ER is the predetermined value E1 or more. Further, the rate for judging termination of integration is also selected from a pair of values of V1 and V2 depending on whether or not the deviation ER is E1 or more. Further, in consideration of a possibility that the actual valve timing VTA is not varied a while after the deviation ER is increased from less than E1 to E1 or more, KI1 is selected for the difference of integrations and V1 is selected for the rate for judging termination of integration for a time of TD after the deviation ER is changed from less than E1 to E1 or more.

Although it is possible to attain the object of the present invention sufficiently using such a simple switching of the difference of integrations, such a simple switching of the rate for judging termination of integration and such a simple judgment of the increment of deviation, it is needless to say that it is possible to successively change the difference of integrations, the rate for judging termination of integration and a timing of judging the increment of deviation based on the deviation ER as shown in FIG. 18 through FIG. 21.

Figure 18:
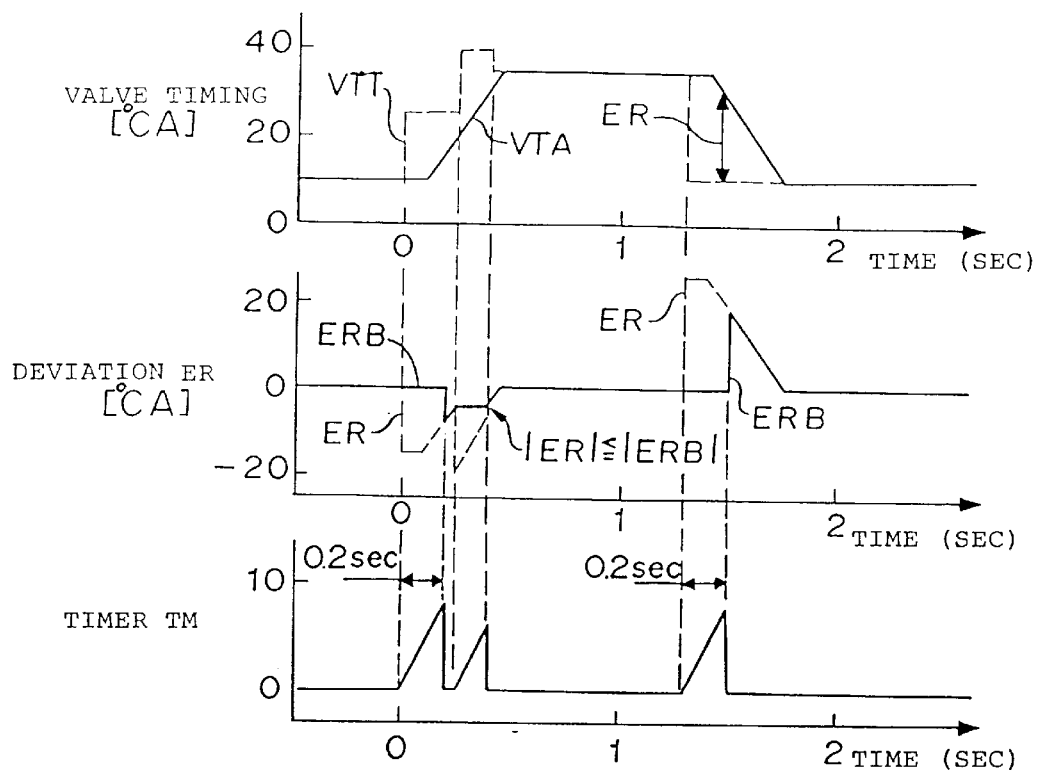
FIG. 18 is a timing chart for explaining operations in accordance with Example 2.

FIG. 18 is a timing chart for showing the deviation ER, a deviation for controlling integration ERB and operation of timer TM. The deviation for controlling integration ERB is made based on the deviation ER. In a case that the absolute value of the deviation ER between the target valve timing VTT and the actual valve timing VTA is increased by a change of operating conditions of the internal combustion engine and so on, for example, the deviation for controlling integration ERB is kept to have the previous value of the deviation ER, which is before the increment of the deviation ER for 0.2 sec. In the other cases, the deviation for controlling integration ERB has the same value as that of the deviation ER. The deviation for controlling integration ERB relates to the deviation between the target valve timing and the actual valve timing.

Figure 19:
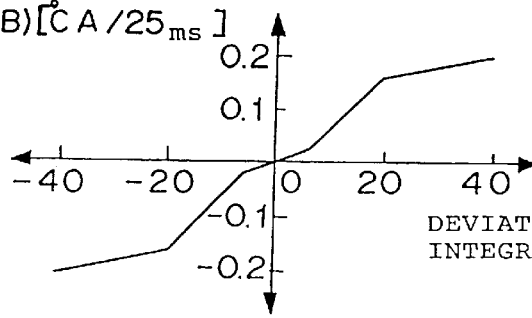
FIG. 19 is a diagram for showing a relation between the deviation for controlling integration ERB and a rate for judging termination of integration VM (ERB) according to Example 2 of the present invention.

Reference VM (ERB) designates the rate for judging termination of integration, for example which has a value changes successively in response to the deviation for controlling integration ERB as shown in FIG. 19, wherein the rate for judging termination of integration is stored in ROM 103 in the form of map in advance. VM (ERB) is preset so as to have a positive value in a case that the deviation for controlling integration ERB is 0 or more and to have a negative value in a case that the deviation ERB is less than 0. Further, the absolute value of VM (ERB) is preset so as to have a larger value as the absolute value of the deviation for controlling integration ERB becomes large, and it is possible to preset the value arbitrarily in accordance with characteristics of the controlling device, whereby it is possible to control with a high accuracy.

Figure 20:
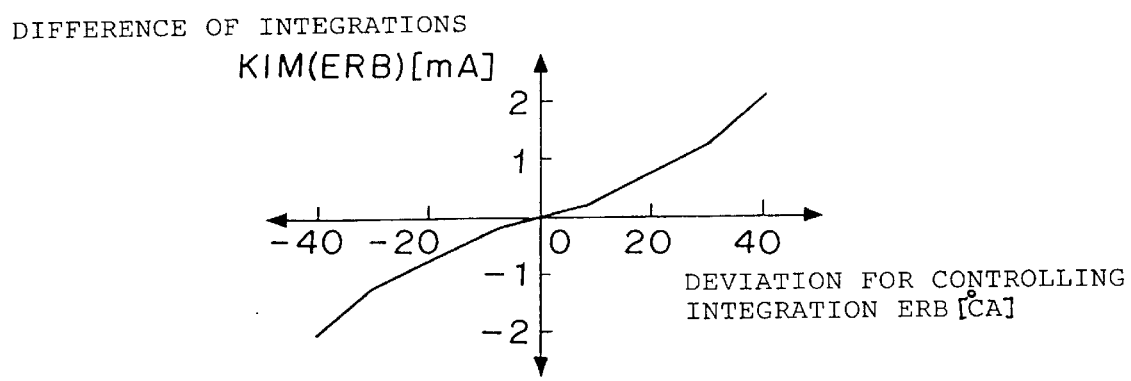
FIG. 20 is a diagram for showing a relation between the deviation for controlling integration ERB and the difference of integrations KIM (ERB) according to Example 2 of the present invention.

Reference KIM (ERB) designates the difference of integrations, for example which is a value changes successively in response to the deviation for controlling integration ERB as shown in FIG. 20, wherein KIM (ERB) is stored in ROM 103 in the form of map in advance. KIM (ERB) is preset so as to have a positive value in a case that the deviation for controlling integration ERB is 0 or more and to have a negative value in a case that the deviation ERB is less than 0. Further, the absolute value of KIM (ERB) is preset so as to have a larger value as the absolute value of the deviation for controlling integration ERB becomes large and it is possible to preset the value arbitrarily in accordance with the characteristics of the controlling device, whereby it is possible to control with high accuracy.

In other words, in Example 2, the deviation for controlling integration ERB is used instead of using the deviation ER. As described in the above, the deviation for controlling integration ERB maintains its value for a predetermined time even though the deviation ER is varied. In other words, even though the deviation ER becomes large because the actual valve timing VTA can not follow sufficiently by, for example, a time lag of transmission of the working oil after the valve timing VTT is changed by a change of operating conditions, the correction value of integration ΣKI is not unnecessarily changed as long as the deviation for controlling integration ERB is not changed for the predetermined time.

Incidentally, the predetermined time 0.2 sec is counted from an arbitrary point after the deviation ER is increased as shown in FIG. 18. Accordingly, it is possible to change arbitrarily the timing for judging the increment of deviation.

In the next, when 0.2 sec passes after the increment of the deviation ER, the value of deviation for controlling integration ERB is substituted by the value of deviation ER. The controlling device reads the rate for judging termination of integration VM (ERB) and the difference of integrations KIM (ERB) from ROM 103 based on the calculated value of the deviation for controlling integration ERB, and judges whether or not the varied rate ΔVT of the actual valve timing VTA is the rate for judging termination of integration VM (ERB), which was read as in the above, or more. In a case that the deviation ER has a positive value and the varied rate ΔVT is the rate for judging termination of integration VM (ERB) or more or the deviation ER has a negative value and the varied rate ΔVT is the rate for judging termination of integration VM (ERB) or less, the integration is terminated because the actual valve timing is heading to the target valve timing VTT at an sufficient rate. On the contrary, in a case that the deviation ER has a positive value and the varied rate ΔVT is less than the rate for judging termination of integration VM (ERB) or the deviation ER has a negative value and the varied rate ΔVT is higher than the rate for judging termination of integration VM (ERB), the integration is executed based on the deviation for controlling integration ERB because it can be judged that the rate of the actual valve timing heading to the target valve timing VTT is slow or that the actual valve timing is diverting from the target valve timing VTT. The difference of integrations KIM (ERB) is read from ROM 103, wherein the difference of integrations becomes larger as the deviation for controlling integration ERB becomes large as shown in FIG. 20.

Accordingly, the actual valve timing VTA can be close to the target valve timing VTT with a larger integrated gain as the deviation for controlling integration ERB is larger. On the other hand, the integrated gain becomes smaller as the actual valve timing VTA is closer to the target valve timing VTT, whereby the actual valve timing VTA can converge at the target valve timing VTT stably at a high rate.

Example 2 is described in detail with reference to the flow chart of FIG. 21.

Figure 21:
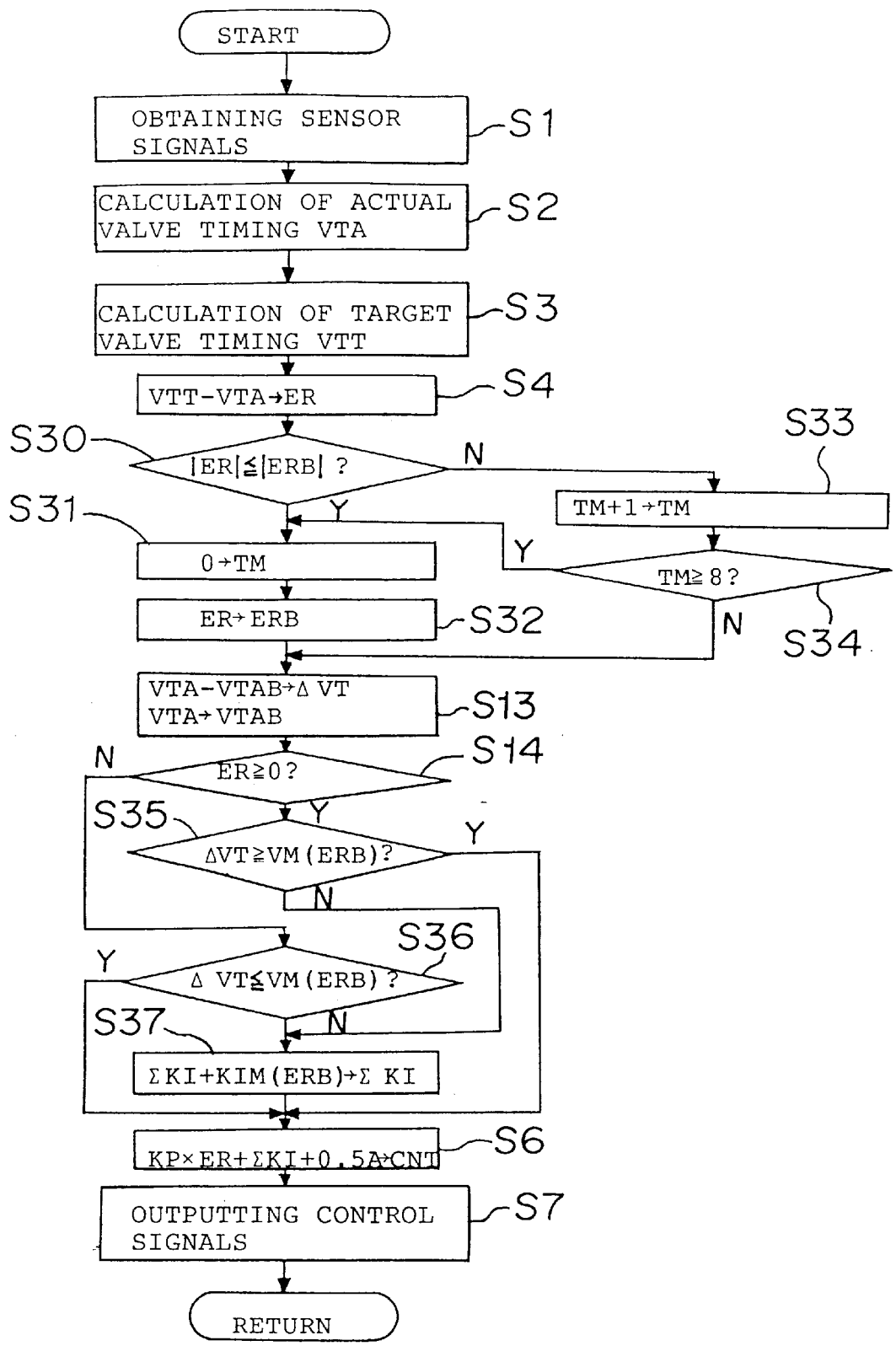
FIG. 21 is a flow chart for showing operations of Example 2 according to Example 2 of the present invention.
Figure 22:
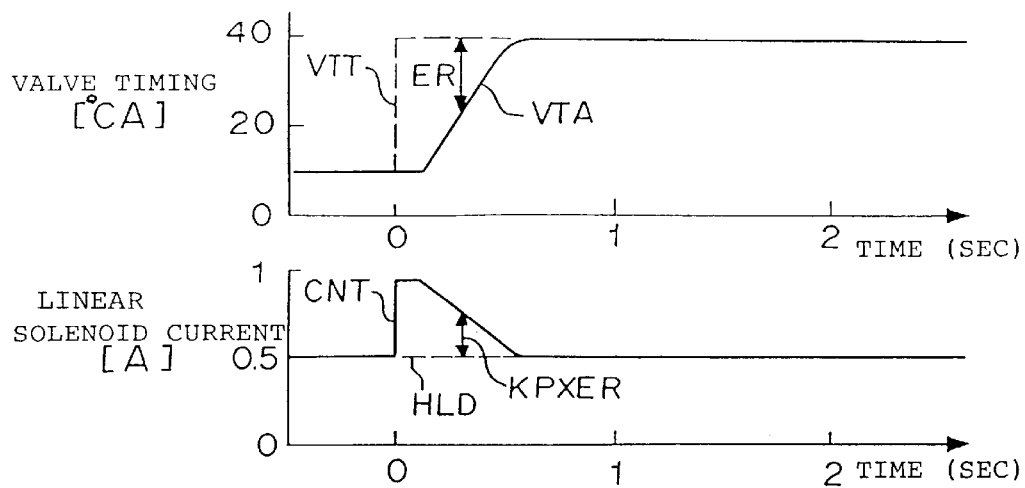
FIG. 22 shows one example of a timing chart for showing operations of a conventional device as Example.
Figure 23:
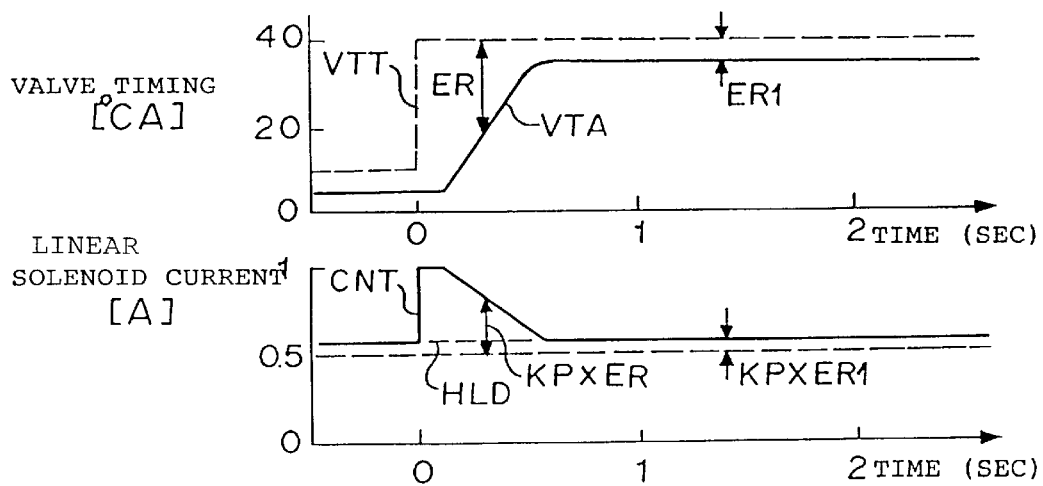
FIG. 23 shows one example of a timing chart for showing operations of a conventional device as Example.
Figure 24:
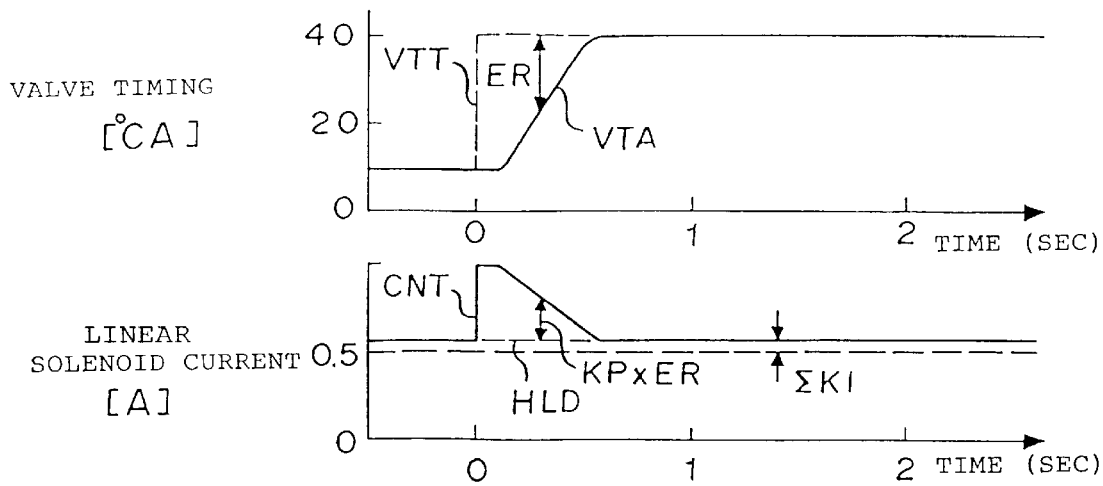
FIG. 24 is one example of a timing chart for showing operations of the conventional device as Example.

In FIG. 21, Steps S10 through S12 and Steps S15 through S26 in the flow chart of FIG. 17 illustrating the operations of Example 1 are substituted by Steps S30 through S34 and Steps S35 through S37 respectively, wherein the same Steps as those of FIG. 1 have the same references and description of these references is omitted. In addition, the flow chart of FIG. 21 is processed in CPU 102 at every 25 ms.

In FIG. 21, after the deviation ER between the target valve timing VTT and the actual valve timing VTA is obtained in Step S4, the absolute value of the deviation ER is judged whether or not the absolute value of the deviation for controlling integration ERB or less in Step S30. In a case that the absolute value of the deviation ER is judged to be the absolute value of the deviation for controlling integration ERB or less at Step S30, the timer TM is reset to be 0 in Step S31, the deviation ER is stored in the deviation for controlling integration ERB in Step S32, and Step S13 is proceeded to. On the other hand, in a case that the absolute value of the deviation ER is judged to be larger than the absolute value of the deviation for controlling integration ERB, it is inferred that the deviation ER was increased and the timer TM is increased by 1. Further, it is judged whether or not timer TM has a value of 8 or more in Step S34, namely a time of 0.2 sec or more lapsed after the deviation was increased. In a case that the timer TM has a value of 8 or more, namely the predetermined period of 0.2 sec or more is judged to have lapsed after the deviation was increased, Step S31 is selected, the timer TM is reset to be 0, and the deviation ER is stored in the deviation for controlling integration ERB in Step S32. In a case that the timer TM has a value of less than 8, namely the lapsed time after the deviation was increased is judged to be less than 0.2 sec, Step S13 is selected.

In the next, in a case that the deviation ER is judged to be 0 or more as a result of the judgment whether or not the deviation ER is 0 or more in Step S14 after the varied rate ΔVT of the actual valve timing VTA was obtained in Step S13, Step S35 is selected. In Step S35, it is judged whether or not the varied rate ΔVT is VM (ERB) or more. In a case that the varied rate ΔVT is judged to be less than VM (ERB), it can be inferred that the actual valve timing VTA is heading to the target valve timing at a rate less than VM/25 ms or that the actual valve timing VTA is diverting from the target valve timing VTT, wherein Step S37 is selected, the predetermined valve KIM (ERB) is added to the correction value of integration ΣKI, and Step S6 is proceeded to. In a case that the varied rate ΔVT is VM (ERB) or more in Step S35, it can be inferred that the actual valve timing VTA is heading to the target valve timing VTT at a rate of VM/25 ms or more, wherein Step S37 is skipped and Step S6 is selected.

On the other hand, in a case that the deviation ER is judged to be less than 0 in Step S14, Step S36 is selected to judge whether or not the varied rate ΔVT is VM (ERB) or less. In a case that the varied rate ΔVT is judged to be larger than VM (ERB), it can be inferred the actual valve timing VTA is heading to the target valve timing VTT at a rate of less than −VM/25 ms or that the actual valve timing VTA is diverting from the target valve timing VTT, wherein Step S37 is selected to add the predetermined KIM (ERB) to the correction value of integration ΣKI and thereafter Step S6 is proceeded to. In a case that the varied rate ΔVT is judged to be VM (ERB) or less in Step S36, it can be inferred that the actual valve timing VTA is heading to the target valve timing VTT at a rate of −VM/25 ms or more, wherein Step S37 is not selected and Step S6 is selected.

In this, Steps S35 and S36 correspond to the means for judging varied rate; Steps S35 and S36 correspond to the means for terminating integration; and Step S37 corresponds to the means for calculating difference of integration and the means for controlling integration.

After the correction value of integration ΣKI is calculated in accordance with the above-mentioned Steps, a linear solenoid current CNT in OCT 80 is calculated in accordance with Formula 6 in Step S6 in the same manner as Example 1. Further, in Step S7, a duty signal corresponding to the linear solenoid current OCV 80 is output to an output port 108.

In Example 1 and Example 2, the operations of integration are terminated in a case that the actual valve timing VTA is heading to the target valve timing VTT at the predetermined rate or more. However, it is also possible to, for example, prohibit the operations of integration in a case that the actual valve timing VTA is heading to the target valve timing VTT regardless of the rate of the actual valve timing VTA heading to the target valve timing VTT.

Further, in Example 1 and Example 2, the deviation ER or the deviation for controlling integration ERB is maintained to be the predetermined value while the predetermined period of 0.2 sec lapses after the deviation ER or the deviation for controlling integration ERB increases.

However, embodiments of the present invention are not limited to as such, and it is possible to calculate the deviation ER or the deviation for controlling integration ERB to be smaller than that after the predetermined period.

Further, in Example 1 and Example 2, the predetermined period of 0.2 sec is used. However, this value can be changed arbitrarily. In addition, the predetermined period of Example 1 and the predetermined period of Example 2 can be different from each other.

Further, in Example 1 and Example 2, the feedback control is performed by the proportional control and the integral control. However, a differential control can further be added as disclosed in Japanese Unexamined Patent Publication Hei 6-159021 (JP-A-6-159021).

Further, in the above examples, the proportional controls are always performed. However, it is possible to prohibit the proportional control in a case that a value relating to deviations such as the deviation ER and the deviation for controlling integration ERB becomes less than a predetermined value (i.e. 1° CA) and to perform only the integral control. In other words, in the case that the value relating to deviation becomes less than the predetermined value, the proportional controlled variable at that time is set to be 0 and the actual valve timing is converged at the target valve timing only by the integral control.

Further, in the above Examples, the method that a main body of mechanism for varying valve timing is rotated along with a rotation of timing pulley is described. However, the present invention is also applicable to a mechanism that the main body of mechanism for varying valve timing is not rotated disclosed in Japanese Patent Application No. Hei 8-267603 (JP8-267603) and a method of detecting the actual valve timing by a potentiometer.

The first advantage of the present invention is that the integration of the difference of integration performed by the means for controlling integration is terminated when the actual valve timing is heading to the target valve timing, whereby the actual valve timing can stably be converged at the target valve timing. On the other hand, in a case that the steady-state deviation is generated between the actual valve timing and the target valve timing, the means for controlling integration performs the integration of the difference of integration, whereby the steady-state deviation can be eliminated.

The second advantage of the present invention is that in a case that the actual valve timing is heading to the target valve timing at the predetermined rate for judging termination of integration or more, the integration of the difference of integrations performed by the means for controlling integration is terminated, whereby when the target valve timing is changed and a value relating to the deviation between the actual valve timing and the target valve timing is increased transiently, the integration of the difference of integration is terminated as long as the actual valve timing is changing at the predetermined rate for judging termination of integration, whereby the correction value of integration is not unnecessarily increased or decreased and the actual valve timing can stably be converged at the target valve timing.

The third advantage of the present invention is that in a case that the absolute value relating to the deviation between the actual valve timing and the target valve timing is small, the rate for judging termination of integration is set to be smaller than that in a case that the absolute value is large, whereby the actual valve timing can stably be converged into the target valve timing under a condition that the actual valve timing exists in the vicinity of the target valve timing.

The fourth advantage of the present invention is that the rate for judging termination of integration is set to be small for a predetermined period after the absolute value relating to the deviation between the actual valve timing and the target valve timing becomes a predetermined valve or more, in comparison with after the predetermined period lapses, whereby even though the absolute value relating to the deviation between the actual valve timing and the target valve timing becomes the predetermined value or more by a change of the target valve timing, the rate for judging termination of integration is set to be small despite a large absolute value relating to the deviation during the predetermined period, whereby the correction value of integration changes slightly and the actual valve timing can stably be converged at the target valve timing.

The fifth advantage of the present invention is that the rate for judging termination of integration is set to be small for a predetermined period after the absolute value relating to the deviation between the actual valve timing and the target valve timing is increased, in comparison with after the predetermined period lapses, whereby a timing for judging increment of deviation can arbitrarily be changed.

The sixth advantage of the present invention is that the difference of integrations is calculated to be smaller in a case that the absolute value relating to the deviation between the actual valve timing and the target valve timing is small than in a case that the absolute value is large, whereby the correction value of integration is changed slightly under a state that the actual valve timing exists in the vicinity of the target valve timing and the actual valve timing can stably be converged at the target valve timing.

The seventh advantage of the present invention is that the difference of integrations is calculated to be small for a predetermined period after the absolute value relating to the deviation between the actual valve timing and the target valve timing becomes the predetermined value or more, in comparison with after the predetermined period lapses, whereby even though the absolute value relating to the deviation between the actual valve timing and the target valve timing becomes the predetermined value or more by the change of the target valve timing, the difference between integrations is calculated to be small despite the large value relating to the deviation for the predetermined period, whereby the correction value of integration varies slightly and the actual valve timing can stably be converged at the target valve timing.

The eighth advantage of the present invention is that the difference of integrations is calculated to be small for a predetermined period after the absolute value relating to the deviation between the actual valve timing and the target valve timing increases, in comparison with after the predetermined period lapses, whereby a timing for judging the increment of deviation can arbitrarily be changed.

The ninth advantage of the present invention is that a control variable for controlling the mechanism for varying valve timing is kept to be a predetermined value in a case that the absolute value relating to the deviation between the actual valve timing and the target valve timing is less than the predetermined value, whereby the controlled variable of the means for controlling actual valve timing is unchanged under a condition that the actual valve timing exists in the vicinity of the target valve timing and the actual valve timing is varied by the means for controlling integration, whereby the actual valve timing can stably be controlled to be the target valve timing.

Obviously, numerous modifications and variations of the present invention are possible in light of the above teachings. It is therefore to be understood that within the scope of the appended claims, the invention may be practiced otherwise than as specifically described herein.

What is claimed is:

1. A valve timing controlling device of internal combustion engine having an intake valve and an exhaust valve driven at a predetermined timing in synchronism with a rotation of the internal combustion engine for opening and closing an intake pipe and an exhaust pipe connected to a combustion chamber comprising:

means for detecting operating conditions of the internal combustion engine;

means for calculating a target valve timing with respect to the operating conditions of the internal combustion engine based on a result of detection from the means for detecting operating conditions;

means for varying a valve timing of opening and closing at least one of the intake valve or the exhaust valve;

means for detecting an actual valve timing of the valve or the valves of which opening and closing timing was varied;

means for controlling actual valve timing which generates a controlled variable for controlling the means for varying valve timing based on a value relating to a deviation between the target valve timing and the actual valve timing;

means for calculating a difference of integrations based on a value relating to the deviation between the actual valve timing and the target valve timing;

means for controlling integration which calculates a correction value to the integrations by integrating the difference of integrations in order to correct the controlled variable for the means for varying valve timing generated by the means for controlling actual valve timing; and means for terminating the integration of the means for controlling integration when the actual valve timing varies so as to follow the target valve timing.

2. A valve timing controlling device of internal combustion engine according to claim 1, wherein said means for terminating integration includes a means for judging varied rate which judges whether or not a varied rate of the actual valve timing is a predetermined rate for judging termination of integration or more; and the integration in the means for controlling integration is terminated when the actual valve timing is judged to vary so as to meet the target valve timing at the predetermined rate for judging termination of integration or more.

3. A valve timing controlling device of internal combustion engine according to claim 2, wherein the means for judging varied rate sets the predetermined rate for judging termination of integration small when an absolute value relating to the deviation between the actual valve timing and the valve timing is small, in comparison with when the absolute value is large.

4. A valve timing controlling device of internal combustion engine according to claim 3, wherein the means for judging varied rate sets the predetermined rate for judging termination of integration small while a predetermined period lapses after the absolute value relating to the deviation between the actual valve timing and the target valve timing becomes a predetermined value, in comparison with after the predetermined period lapses.

5. A valve timing controlling device of internal combustion engine according to claim 3, wherein the means for judging varied rate sets the predetermined rate for judging termination of integration small while a predetermined period lapses after the absolute value relating to the deviation between the actual valve timing and the target valve timing increases, in comparison with after the predetermined period lapses.

6. A valve timing controlling device of internal combustion engine according to claim 1, wherein said means for calculating difference of integrations calculates the difference of integrations to be small when the absolute value relating to a deviation between the actual valve timing and the target valve timing is small, in comparison with when the absolute value is large.

7. A valve timing controlling device of internal combustion engine according to claim 6, wherein the means for calculating difference of integrations calculates the difference of integrations to be small while a predetermined period lapses after the absolute value relating to the deviation between the actual valve timing and the target valve timing becomes a predetermined value, in comparison with after the predetermined period lapses.

8. A valve timing controlling device of internal combustion engine according to claim 6, wherein the means of calculating difference of integrations calculates the difference of integrations to be small while a predetermined period lapses after the absolute value relating to the deviation between the actual valve timing and the target valve timing increases, in comparison with after the predetermined period lapses.

9. A valve timing controlling device of the internal combustion engine according to claim 1, wherein said means for calculating actual valve timing maintains said controlled variable for controlling said means for varying valve timing at a predetermined value when the absolute value relating to the deviation between the actual valve timing and the target valve timing is less than a predetermined value.

\* \* \* \* \*